United States Patent [19]
Moriya et al.

[11] Patent Number: 5,895,852
[45] Date of Patent: Apr. 20, 1999

[54] ANGULAR VELOCITY SENSOR

[75] Inventors: Kazufumi Moriya, Yokohama; Tomoyasu Hasegawa; Eiichi Takata, both of Sagamihara; Tomio Shibano, Yokohama; Tetsuo Osawa, Kita-ku, all of Japan

[73] Assignee: Murata Manufacturing Co., Ltd., Japan

[21] Appl. No.: 08/786,236

[22] Filed: Jan. 21, 1997

[30] Foreign Application Priority Data

Jan. 22, 1996 [JP] Japan ................................ 8-027294

[51] Int. Cl.$^6$ ........................................................ G01P 3/44
[52] U.S. Cl. ................................ 73/504.12; 73/504.16
[58] Field of Search ........................... 73/504.12, 504.02, 73/504.04, 504.03, 504.16, 504.15; 310/309, 366

[56] References Cited

U.S. PATENT DOCUMENTS

| | | | |
|---|---|---|---|
| 5,349,855 | 9/1994 | Bernstein et al. | 73/504.16 |
| 5,465,620 | 11/1995 | Sanderson et al. | 73/504.12 |
| 5,610,334 | 3/1997 | Fima et al. | 73/504.12 |
| 5,703,293 | 12/1997 | Zabler et al. | 73/504.02 |
| 5,734,105 | 3/1998 | Mizukoshi | 73/504.02 |

*Primary Examiner*—Hezron E. Williams
*Assistant Examiner*—Richard A. Moller
*Attorney, Agent, or Firm*—Ostrolenk, Faber, Gerb & Soffen, LLP

[57] ABSTRACT

In an angular velocity sensor for sensing angular velocities about two axes or an X-axis and a Y-axis which are perpendicular to each other, a frame-shaped oscillator 26 is disposed to the respective support portions 24 fixed on a substrate 22 through support beams 25 and a columnar electrode 33 is disposed in the oscillator 26 by being fixed to the substrate 22. X-axis displacement sensing units 31, 31 are formed on the right and left sides of the oscillator 26 and Y-axis displacement sensing units 32, 32 are formed to the forward and rearward sides thereof. When an oscillation drive signal is imposed between the oscillator 26 and the columnar electrode 33, an electrostatic attracting force is generated therebetween and the oscillator 26 is oscillated in a Z-axis direction. When an angular velocity $\Omega Y$ is imposed about the Y-axis at this time, the oscillator 26 is displaced to the X-axis by a Coriolis force and the displacement can be sensed by the X-axis displacement sensing units 31, whereas when an angular velocity $\Omega X$ is imposed about the X-axis, the oscillator 26 is displaced to the Y-axis by a Coriolis force and the displacement can be sensed by the Y-axis displacement sensing units 32, so that the angular velocities about the two axes or the X-axis and the Y-axis can be sensed, respectively.

23 Claims, 13 Drawing Sheets

ANGULAR VELOCITY SENSOR

BACKGROUND OF THE INVENTION

1. Field of the Invention

The present invention relates to an angular velocity sensor preferably used to sense the angular velocity of, for example, a rotary member and the like.

2. Description of the Related Art

An angular velocity sensor of prior art will be described based on FIG. 16 to FIG. 18.

In the drawings, numeral 1 denotes an angular velocity sensor made by a micromachining technology and numeral 2 denotes a substrate formed of, for example, a monocrystal silicon material of high resistance so as to constitute the main body of the angular velocity sensor 1 and the substrate 2 is formed to a rectangular sheet-shape as shown in FIG. 16 and FIG. 17. For convenience, the direction perpendicular to the lengthwise direction of the substrate 2 is called an X-axis direction and the thickness direction thereof is called a Z-axis direction here.

Numeral 3 denotes a movable portion composed of polysilicon of low resistance with which impurities such as P, B, Sb etc. are doped. The movable portion 3 is formed on the substrate 2 through an insulation film 4 (see FIG. 18) composed of, for example, silicon oxide or the like and formed on the surface of the substrate 2. The movable portion 3 is composed of a pair of support portions 5 fixed so as to define in a Y-axis direction, four support beams 6 having base ends formed integrally with the respective support portions and linearly extending in the Y-axis direction and an approximately rectangular oscillator 7 formed to the extreme ends of the respective support beams 6 integrally therewith. Movable-side comb-shaped electrodes 8, 8 composed of a plurality of electrode plates 8A are projectingly formed to both the right and left side surfaces of the oscillator 7 in the X-axis direction. Further, the movable portion 3 is arranged such that only the respective support portions 5 are fixed to the substrate 2 and the respective support beams 6 and the oscillator 7 are held in parallel with the substrate 2 in the state that they are spaced apart therefrom a predetermined distance so that the oscillator 7 can be displaced in the X-axis direction and the Z-axis direction with respect to the substrate 2.

Numerals 9, 9 denote fixed-side comb-shaped electrodes disposed on the substrate 2 so as to be located on the right and left sides of the oscillator 7. The respective fixed-side comb-shaped electrodes 9 are composed of fixed portions 9A, 9A located on both the right and left sides of the oscillator 7 and disposed on the substrate 2 and a plurality of electrode plates 9B projectingly formed to the respective fixed portions 9A so as to confront the respective electrode plates 8A of the movable-side comb-shaped electrodes 8. Then, as shown in FIG. 17, the movable-side comb-shaped electrode 8 confronts the fixed-side comb-shaped electrode 9 through an interval and the respective electrode plates 8A and the respective electrode plates 9B are alternately disposed so that they are meshed with each other.

Numerals 10, 10 denote oscillation generators serving as oscillation generation means and each of them is composed of the movable-side comb-shaped electrode 8 and the fixed-side comb-shaped electrode 9. When an oscillation drive signal of a frequency f is alternately imposed on the respective oscillation generators 10, an electrostatic attracting force is generated between the respective electrode plates 8A, 9B in an opposite direction alternately and the oscillator 7 is oscillated in the X-axis direction by the electrostatic attracting force as shown by an arrow A.

Numeral 11 denotes a substrate side electrode formed on the substrate 2. As shown in FIG. 18, the substrate side electrode 11 is formed to have conductivity by being densely doped with impurities such as, for example, P, Sb etc. on the surface thereof, and is located below the oscillator 7 and confronts the oscillator 7 such that it is spaced apart therefrom a predetermined distance.

Numeral 12 denotes a displacement sensing unit serving as displacement sensing means which is composed of the oscillator 7 and the substrate side electrode 11 and senses the change in interval between the oscillator 7 and the substrate side electrode 11 in the Z-axis direction as a change in capacitance therebetween.

In the angular velocity sensor 1 arranged as described above, when the oscillation drive signal of a frequency f acting as an opposite phase is imposed on the respective oscillation generators 10, the oscillator 7 is oscillated in the x-axis direction with respect to the substrate 2 as shown by the arrow A of FIG. 16 and when an angular velocity $\Omega$ is imposed on the substrate 2 in this state using the Y-axis as a rotating axis, a Coriolis force (inertia) F is alternately generated in the Z-axis direction to the oscillator 7 in proportion to the angular velocity $\Omega$.

As a result, the oscillator 7 is oscillated in the Z-axis direction with an amplitude proportional to the Coriolis force F and the angular velocity $\Omega$ imposed about the Y-axis is sensed by sensing the change in amplitude (displacement) of the oscillation as the change in capacitance between the oscillator 7 and the substrate side electrode 11 by the displacement sensing unit 12.

Further, since the Coriolis force F acting on the oscillator 7 is also proportional to the magnitude of the amplitude resulting from the oscillation in the direction of the arrow A which is generated in the X-axis direction, the angular velocity sensor 1 can sense the angular velocity $\Omega$ about the Y-axis with a pinpoint accuracy by making the frequency f of the oscillation drive signal to be imposed approximately equal to the dynamic resonant frequency of the oscillator 7 so as to increase the displacement of the oscillator 7 in the Z-axis direction caused by the Coriolis force F by greatly oscillating the oscillator 7 in the X-axis direction.

Incidentally, in the aforesaid prior art, the angular velocity sensor 1 is arranged to sense an angular velocity about only one axis such as, for example, the Y-axis. At present, however, a sensing accuracy is enhanced by sensing angular velocities about two axes perpendicular to each other in such applications as the prevention of oscillation caused by hand in video cameras, the sensing of angles in car navigation, and the like, thus there are employed two angular velocity sensors each sensing an angular velocity about one axis with the sensing axes of these angular velocity sensors being disposed perpendicular to each other.

Therefore, in the aforesaid angular velocity sensor 1, it is contemplated to dispose the two angular velocity sensors 1 so that the sensing axes thereof are perpendicular to each other to sense angular velocities about two axes perpendicular to each other. In such an arrangement, however, there is a problem that it is very difficult to dispose the axes with a pinpoint accuracy and yield is lowered in manufacture. Also, since a space in which the angular velocity sensors 1 are mounted to a printed circuit board is needed, the size of video camera sets and the like is increased. Further, although it is also contemplated to form the two angular velocity sensors 1 on the substrate 2 so that the sensing axes thereof are perpendicular to each other, there is a problem that the area of the substrate 2 is increased and the miniaturization of the angular velocity sensor 1 is made difficult as well as a manufacturing cost is increased.

Further, since the resonant frequency of the oscillator 7 has a certain degree of dispersion, when the oscillators 7 of the above respective angular velocity sensors 1 have a different resonant frequency, an oscillation drive signal generating circuit is necessary for each of the angular velocity sensors 1, by which the substrate area of the generating circuits is increased.

SUMMARY OF THE INVENTION

An object of the present invention made taking the problems of the prior art into consideration is to provide an angular velocity sensor capable of sensing angular velocities about two horizontal axes perpendicular to each other.

To solve the aforesaid problems, an angular velocity sensor according to one aspect of the present invention comprises a substrate, an oscillator structured and arranged with respect to the surface of the substrate so as to displace in three-axes directions composed of an X-axis direction, a Y-axis direction and a Z-axis direction with respect to the substrate, an oscillation generator or oscillation generation means including the oscillator for oscillating the oscillator in the Z-axis direction and a displacement sensor or displacement sensing means for sensing the amount of displacement of the oscillator when the oscillator is displaced in the Y-axis direction or the X-axis direction by an angular velocity about the X-axis or the Y-axis.

With the above arrangement, when, for example, an angular velocity is imposed about the Y-axis in the state that the oscillator is oscillated in the Z-axis direction by the oscillation generation means, the oscillator is displaced in the X-axis direction by receiving a Coriolis force and the displacement sensing means senses the displacement of the oscillator as an angular velocity about the Y-axis added to the angular velocity. On the other hand, when an angular velocity is imposed about the X-axis, the oscillator is displaced in the Y-axis direction by receiving a Coriolis force and the displacement sensing means senses the displacement of the oscillator in the Y-axis direction as an angular velocity imposed about the X-axis of the angular velocity sensor.

According to another aspect of the present invention, an angular velocity sensor is arranged such that the oscillation generation means is composed of an oscillator formed to a frame-shape and a columnar electrode located in the oscillator so as to be fixed to the substrate and formed to a column-shape with a height lower than the height of the oscillator.

With the above arrangement, when an oscillation drive signal of a predetermined frequency is imposed between the frame-shaped oscillator and the columnar electrode, an electrostatic attracting force is generated between the oscillator and the columnar electrode and acts in the direction where the effective area between the oscillator and the columnar electrode is increased and as a result the oscillator is attracted toward the substrate side and the repetition of the above operation causes the oscillator to oscillate in the Z-axis direction.

According to still another aspect of the present invention, since the oscillation generation means is composed of a piezoelectric member fixed on the lower surface of the substrate, when an oscillation drive signal is imposed on the piezoelectric member, it repeats extension and contraction in the Z-axis direction to thereby generate oscillation to the substrate, so that the oscillator formed on the substrate is oscillated by the oscillation in the Z-axis direction.

According to a further aspect of the present invention, an angular velocity sensor is arranged such that the displacement sensing means constitutes an X-axis direction displacement sensing means including a first movable-side electrode formed in the X-axis direction of the oscillator and a first fixed-side electrode formed to the substrate so as to confront the first movable-side electrode and a Y-axis direction displacement sensing means including a second movable-side electrode formed in the Y-axis direction of the oscillator and a second fixed-side electrode formed to the substrate so as to confront the second movable-side electrode.

With the above arrangement, when, for example, an angular velocity is imposed about the Y-axis in the state that the oscillator is oscillated in the Z-axis direction by the oscillation generation means, the oscillator is displaced in the X-axis direction by receiving a Coriolis force, the displacement appears as the change in effective area or interval between the first movable-side electrode and the first fixed-side electrode and the X-axis direction displacement sensing means senses the change as the change in capacitance. On the other hand, when an angular velocity is imposed about the X-axis, the oscillator is displaced in the Y-axis direction by receiving a Coriolis force, the displacement appears as the change in effective area or interval between the second movable-side electrode and the second fixed-side electrode and the Y-axis direction displacement sensing means senses the change as the change in capacitance.

Other features and advantages of the present invention will become apparent from the following description of the invention which refers to the accompanying drawings.

DESCRIPTION OF THE PREFERRED EMBODIMENTS

Embodiments of the present invention will be described below in detail referring to FIGS. 1–15 of the accompanying drawings.

Figure 1:
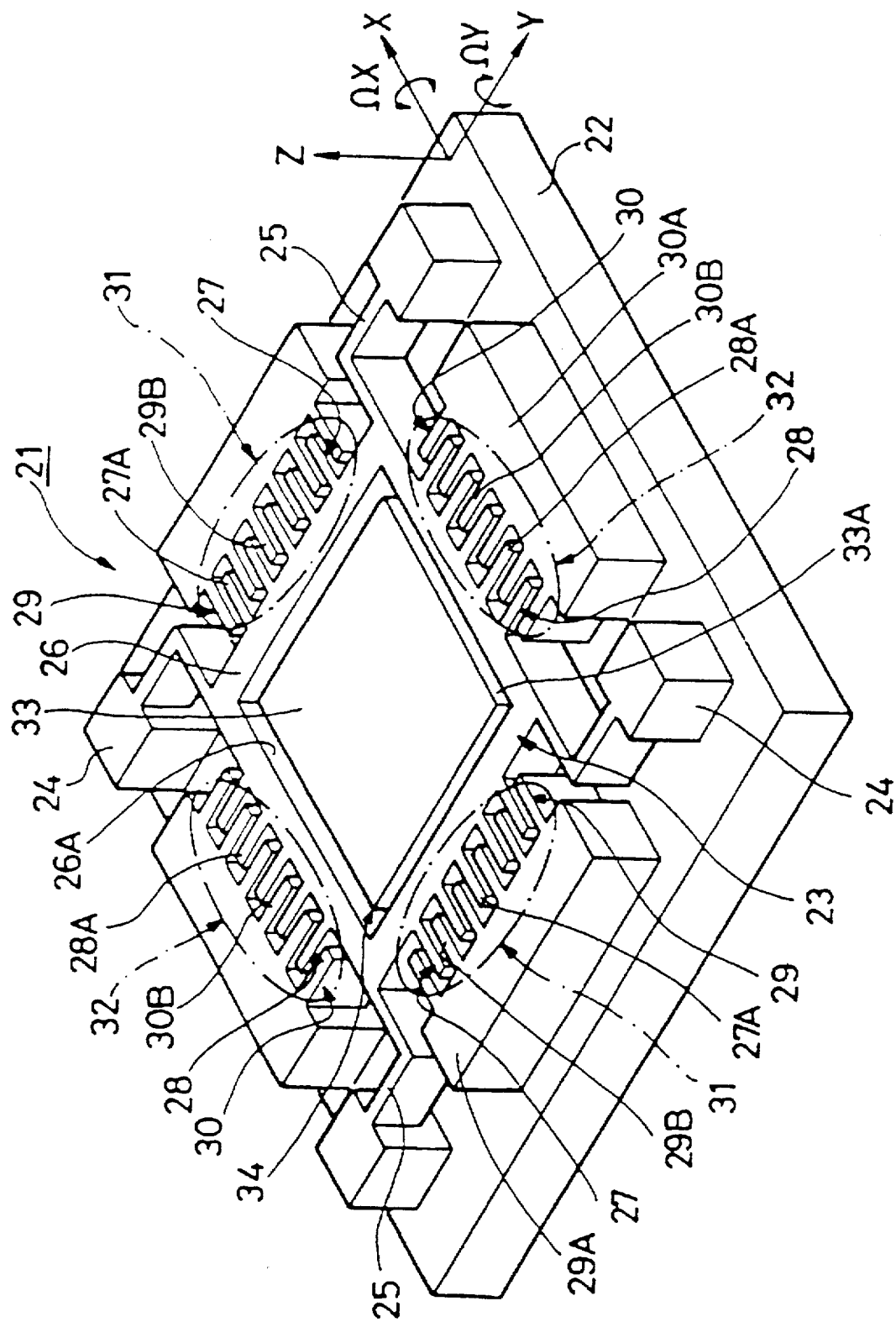
FIG. 1 a perspective view showing an angular velocity sensor according to a first embodiment of the present invention.
Figure 2:
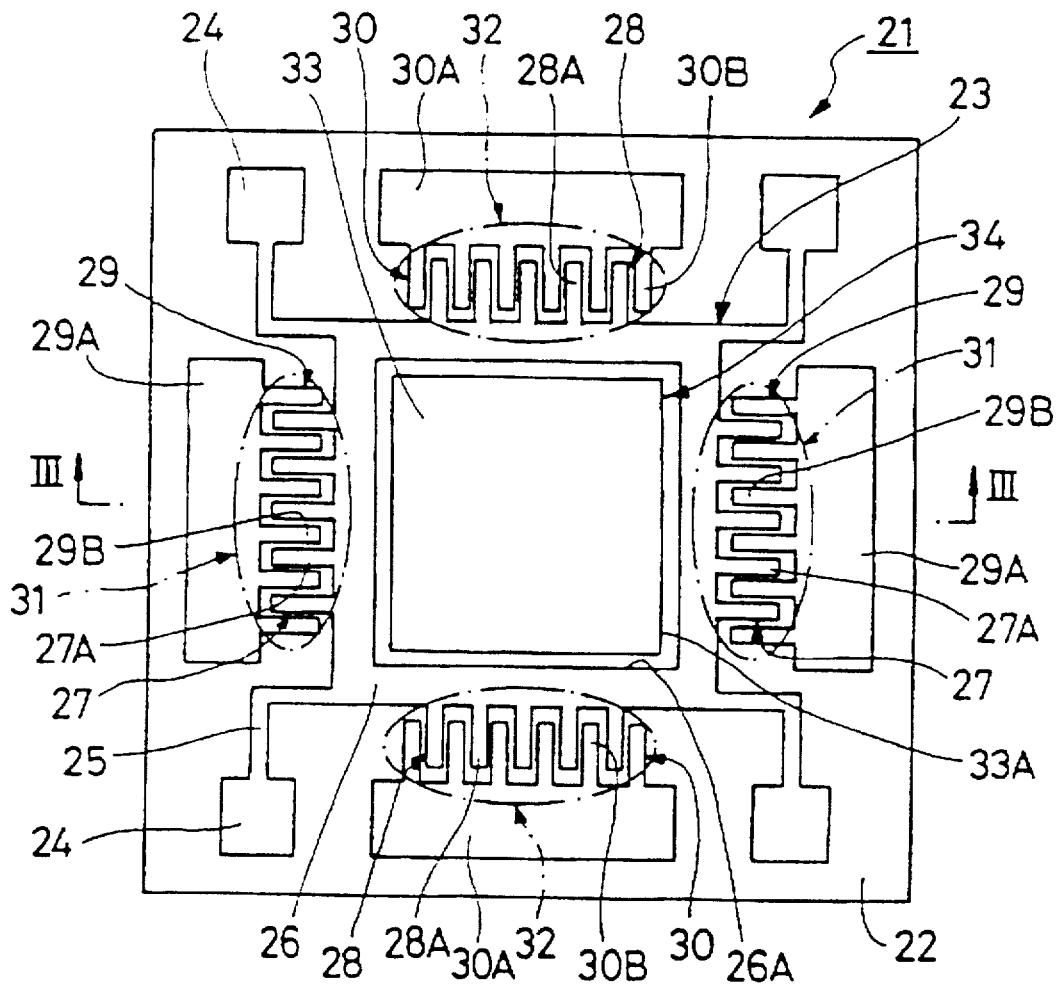
FIG. 2 is a plan view when the angular velocity sensor in FIG. 1 is viewed from an upper side.
Figure 3:
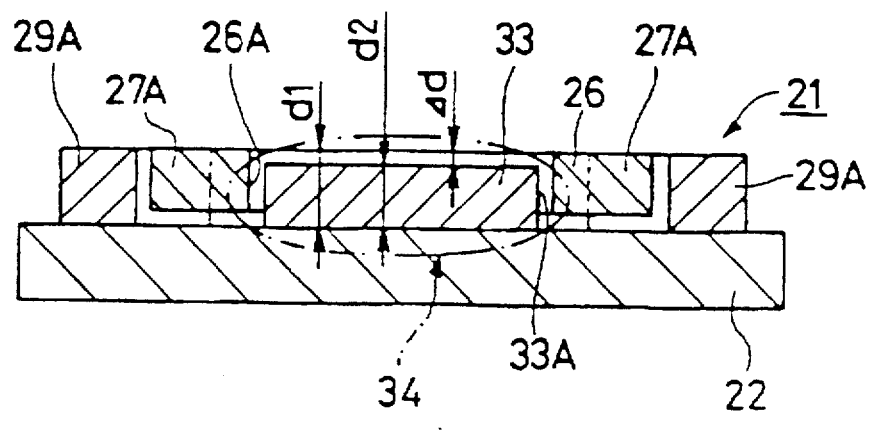
FIG. 3 is a longitudinal cross sectional view of the angular velocity sensor when viewed in the direction of the arrow III—III in FIG. 2.

First, an angular velocity sensor according to a first embodiment is shown in FIG. 1–FIG. 3.

In the drawings, numeral 21 denotes an angular velocity sensor according to the present invention and numeral 22 denotes a substrate similar to that of the prior art on which the angular velocity sensor 21 is formed. As shown in FIG. 1 and FIG. 2, the substrate 22 is composed of, for example, a monocrystal silicon material of high resistance formed to a square sheet-shape. For convenience, axes perpendicular to each other in the direction horizontal to the substrate 22 are called X-axis and Y-axis directions, respectively and a direction vertical to the substrate 22 is called a Z-axis direction as shown in FIG. 1.

Numeral 23 denotes a movable portion formed on the substrate 22. As shown in FIG. 1, the movable portion 23 is formed by etching, for example, a polysilicon film of low resistance and is composed of: four support portions 24 formed on the substrate 22 at the four corners thereof; four L-shaped support beams 25 each having a base end disposed to each of the support portions 24 and an extreme end formed toward the center of the substrate 22; and a frame-shaped oscillator 26 which is supported by the extreme ends of the respective support beams 25 so as to displace in the three-axes directions, that is, the X-axis and Y-axis directions as the directions parallel with the substrate 22 and the Z-axis direction vertical thereto. Further, the movable portion 23 is arranged such that only the respective support portions 24 are fixed on the substrate 22 and the respective support beams 25 and the oscillator 26 are held such that they are spaced apart from the surface of the substrate 22.

As shown in FIG. 2, each one of the support beams 25 extends from each of the support portions 24 and is formed by being bent to the L-shape having a portion parallel with the X-axis and a portion parallel with the Y-axis. With this arrangement, the bending of the portions parallel with the X-axis of the respective support beams 25 causes the oscillator 26 to displace in the Y-axis direction, whereas the bending of the portions parallel with the Y-axis causes the oscillator 26 to displace in the X-axis direction as well as the respective support beams 25 permit the oscillator 26 to displace in the Z-axis direction. With this arrangement, the oscillator 26 is supported so that it can be displaced by the respective support beams 25 in the three-axes directions or the X-axis, Y-axis and Z-axis directions with respect to the substrate 22.

Further, the oscillator 26 is formed to the square frame-shape with the four apexes thereof connected to the support beams 25, respectively and the outer side surfaces 33A of a columnar electrode 33 to be described later are disposed to the four inside surfaces 26A of the oscillator 26 with equal intervals defined therebetween.

Numerals 27, 27 denote first movable-side comb-shaped electrodes disposed to the right and left outer peripheries of the oscillator 26 and each of the first movable-side comb-shaped electrodes 27 is composed of five sheet-shaped electrode plates 27A extending in the X-axis direction, respectively.

Numerals 28, 28 denote second movable-side comb-shaped electrodes disposed to the forward and backward outer peripheries of the oscillator 26 and each of the second movable-side comb-shaped electrodes 28 is composed of five sheet-shaped electrode plates 28A extending in the Y-axis direction, respectively. The second movable-side comb-shaped electrodes 28 are perpendicular to the first movable-side comb-shaped electrodes 27 and they are alternately disposed along the four sides of the oscillator 26.

Numerals 29, 29 denote first fixed-side comb-shaped electrodes disposed to the right and left outer peripheries of the oscillator 26 on the substrate 22 and the respective electrodes 29 are composed of fixed portions 29A, 29A disposed on the substrate 22 to both the right and left sides of the oscillator 26 and six sheet-shaped electrode plates 29B projecting from the respective fixed portions 29A so as to confront the respective electrode plates 27A of the first movable-side comb-shaped electrodes 27.

Numerals 30, 30 denote second fixed-side comb-shaped electrodes disposed on the substrate 22 to the forward and backward sides of the oscillator 26 and the respective electrodes 30 are composed of fixed portions 30A, 30A disposed on the substrate 22 to the forward and backward sides of the oscillator 26 and each six sheet-shaped electrode plates 30B projecting from the fixed portions 30A to confront the respective electrode plates 28A of the second movable-side comb-shaped electrodes 28.

Numerals 31, 31 denote X-axis displacement sensing units serving as X-axis displacement sensing means. Each of the sensing units 31 is composed of the first movable-side comb-shaped electrode 27 and the first fixed-side comb-shaped electrode 29. Equal intervals are defined between the respective electrode plates 27A of the first movable-side comb-shaped electrode 27 and the respective electrode plates 29B of the first fixed-side comb-shaped electrode 29 and a parallel flat-plate sensing capacitor is composed of the first movable-side comb-shaped electrodes 27 and the first fixed-side comb-shaped electrodes 29. Further, the X-axis displacement sensing units 31 sense the change in effective area between the respective electrode plates 27A, 29A as the change in capacitance. In addition, the output sides of the right and left X-axis displacement sensing units 31 are connected to calculate the difference between the outputs therefrom.

Numerals 32, 32 denote Y-axis displacement sensing units serving as Y-axis displacement sensing means. Each of the sensing units 32 is composed of the second movable-side comb-shaped electrode 28 and the second fixed-side comb-shaped electrode 30. Equal intervals are defined between the respective electrode plates 28A of the second movable-side comb-shaped electrode 28 and the respective electrode plates 30B of the second fixed-side comb-shaped electrode 30 and a parallel flat-plate sensing capacitor is composed of the second movable-side comb-shaped electrodes 28 and the second fixed-side comb-shaped electrodes 30. Further, the Y-axis displacement sensing units 32 sense the change in effective area between the respective electrode plates 28A, 30B as the change in capacitance. In addition, the output sides of the forward and backward Y-axis displacement sensing units 32 are connected to calculate the difference between the outputs therefrom.

Next, numeral 33 denotes a columnar electrode fixed to the substrate 22 at the center thereof. The columnar electrode 33 is formed of a square columnar silicon material of low resistance and equal intervals are set between the four outside surfaces 33A of the columnar electrode 33 and the four inside surfaces 26A of the oscillator 26, respectively. If the height of the oscillator 26 is d1 and the height of the columnar electrode 33 is d2 with respect to the substrate 22, the height d2 of the columnar electrode 33 is formed slightly shorter than the height d1 of the oscillator 26 by Δd (see FIG. 3).

Numeral 34 denotes an oscillation generator serving as oscillation generation means which is composed of the frame-shaped oscillator 26 and the columnar electrode 33 located inwardly of the oscillator 26. Since the four inside surfaces 26A of the oscillator 26 are equally spaced apart from the four outside surfaces 33A of the columnar electrode 33, an electrostatic attracting force is generated between the oscillator 26 and the columnar electrode 33 by imposing an oscillation drive signal of a predetermined frequency therebetween and the electrostatic attracting force acts in the direction where the effective area between the oscillator 26 and the columnar electrode 33 is increased. With this operation, the oscillator 26 is raised up by Δd where the oscillator 26 is substantially as high as the columnar electrode 33. This operation is repeated at each predetermined frequency to thereby oscillate the oscillator 26 in the Z-axis direction.

Note, the present invention causes the oscillator 26 to generate resonation so that the amplitude of the oscillator 26 is increased in the Z-axis direction by forming the movable portion 23 such that the natural frequency of the oscillator 26 coincides with the frequency of the oscillation drive signal.

The angular velocity sensor 21 of this embodiment is arranged as described above and an angular velocity sensing operation will be described next.

First, when an oscillation drive signal is imposed on the oscillation generator 34, an electrostatic attracting force is generated between the oscillator 26 and the columnar electrode 33 and the oscillator 26 is oscillated in the Z-axis direction by the electrostatic attracting force.

When an angular velocity ΩY is imposed about, for example, the Y-axis in this state, a Coriolis force is generated in the X-axis direction to the oscillator 26, which can be displaced in the X-axis direction, in proportion to the magnitude of the angular velocity ΩY and the amplitude of the oscillator 26. As a result, the oscillator 26 is oscillated in the X-axis direction by the Coriolis force F, so that the respective electrode plates 27A of one of the first movable-side comb-shaped electrodes 27 are oscillated in the direction (X-axis direction) where the mesh thereof with the respective electrode plates 29B of one of the first fixed-side comb-shaped electrode 29 is made deeper as well as the respective electrode plates 27A of the other of the first movable-side comb-shaped electrodes 27 are oscillated in the direction where the mesh thereof with the respective electrode plates 29B of the other of the first fixed-side comb-shaped electrode 29 is made shallower in accordance with the displacement of the oscillator 26 to thereby change the effective areas. With this operation, the X-axis displacement sensing units 31 can sense the angular velocity ΩY about the Y-axis by sensing the change in effective areas of the electrode plates 27A, 29B as a change in capacitance.

Further, since the effective areas are sensed as the differential capacitance between the right and left X-axis displacement sensing units 31, 31 and as the differential capacitance between the forward and backward Y-axis displacement sensing units 32, 32, the output signals from the respective X-axis displacement sensing units 31 based on the differential capacitance are output as large outputs. Whereas, the output signals from the respective Y-axis displacement sensing units 32 based on the differential capacitance are made zero. Further, all the differential capacitance when the respective X-axis displacement sensing units 31 and the respective Y-axis displacement sensing units 32 are displaced in the Z-axis direction is canceled so that output signals are made to zero.

On the other hand, when an angular velocity ΩX is imposed about the X-axis, a Coriolis force is generated in the Y-axis direction to the oscillator 26, which can be displaced in the Y-axis direction, in proportion to the magnitude of the angular velocity ΩX and the amplitude of the oscillator 26.

As a result, the oscillator 26 is oscillated in the Y-axis direction by the Coriolis force F, so that the respective electrode plates 28A of one of the second movable-side comb-shaped electrodes 28 are oscillated in the direction (X-axis direction) where the mesh thereof with the electrode plates 30B of one of the second fixed-side comb-shaped electrode 30 is made deeper as well as the electrode plates 28A of the other of the second movable-side comb-shaped electrodes 28 are oscillated in the direction where the mesh thereof with the electrode plates 30B of the other of the second fixed-side comb-shaped electrode 30 is made shallower in accordance with the displacement of the oscillator 26 to thereby change the effective areas. With this operation, the Y-axis displacement sensing units 32 can sense the angular velocity ΩX about the X-axis by sensing the change in the effective areas of the electrode plates 28A, 30B as a change in capacitance.

Further, since the effective areas are sensed as the differential capacitance between the right and left X-axis displacement sensing units 31, 31 and as the differential capacitance between the forward and backward Y-axis displacement sensing units 32, 32, the output signals from the respective X-axis displacement sensing units 31 based on the differential capacitance are made zero, whereas the output signals from the respective Y-axis displacement sensing units 32 based on the differential capacitance are output as large signals.

However, in the angular velocity sensor 21 according to this embodiment, the X-axis displacement sensing units 31 can sense the displacement in the X-axis direction caused by the Coriolis force as to the angular velocity ΩY about the Y-axis and the Y-axis displacement sensing units 32 can sense the displacement in the Y-axis direction caused by the Coriolis force as to the angular velocity ΩX about the X-axis when the oscillator 26 is oscillated in the Z-axis direction by the oscillation generator 34, so that the angular velocities about the two axes or the X-axis and the Y-axis which are perpendicular to each other in the horizontal direction can be sensed by the single angular velocity sensor 21.

Since the oscillator 26 is formed in a frame-shape, the air damping of the oscillator 26 can be reduced by greatly reducing the air resistance of the oscillator 26 when it is oscillated in the Z-axis direction. With this arrangement, the oscillator 26 can be largely oscillated in the Z-axis direction by the oscillation generator 34, so that the change of the oscillator 26 caused by the Coriolis force is increased to thereby enhance the sensing sensitivity of the X-axis displacement sensing units 31 or the Y-axis displacement sensing units 32.

Further, since the angular velocity sensor 21 can sense the angular velocities $\Omega X$, $\Omega Y$ about the two axes, the X-axis and the Y-axis, in a small space, the area of the substrate 22 and a manufacturing cost can be greatly reduced.

Figure 4:
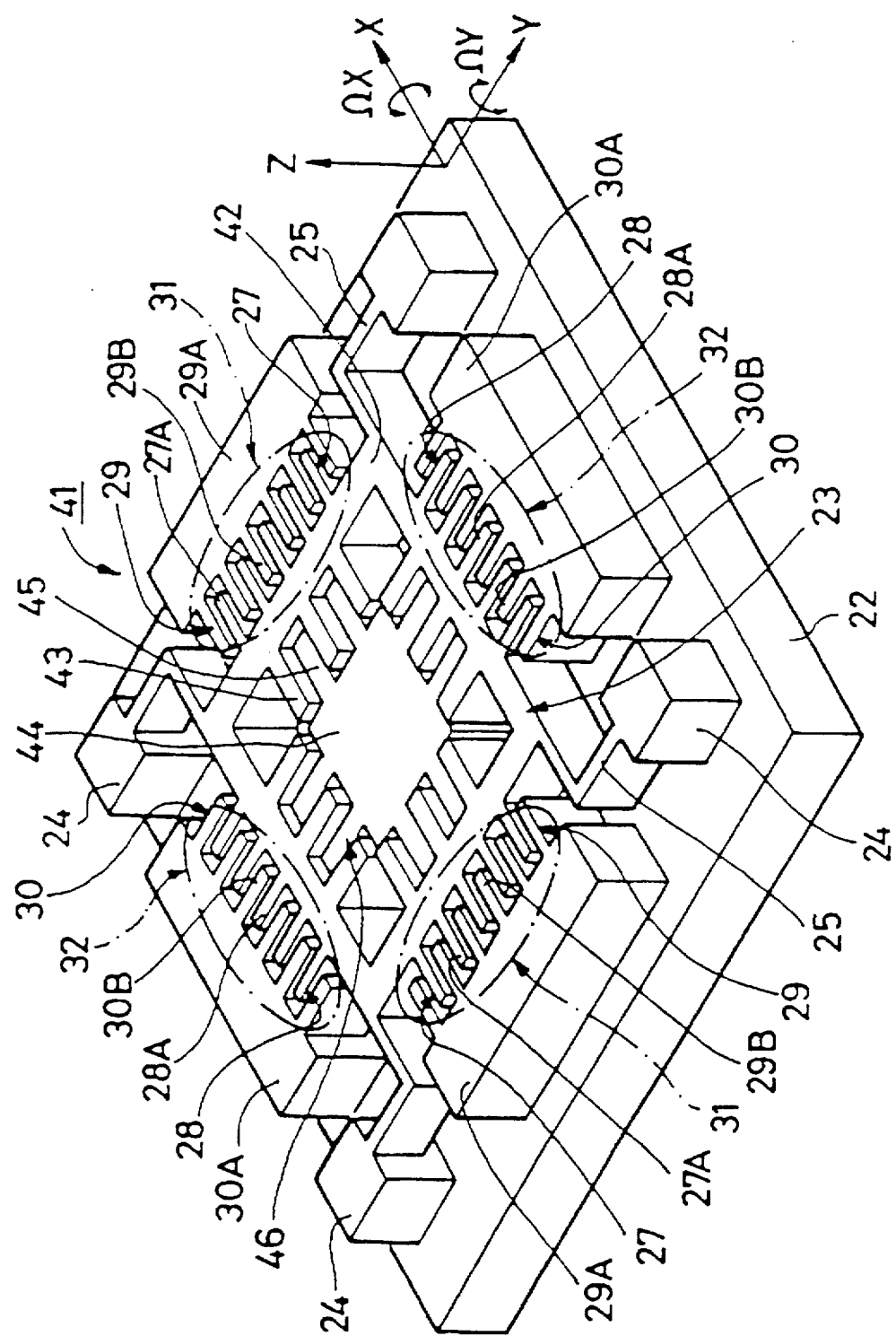
FIG. 4 is a perspective view showing an angular velocity sensor according to a second embodiment of the present invention.
Figure 5:
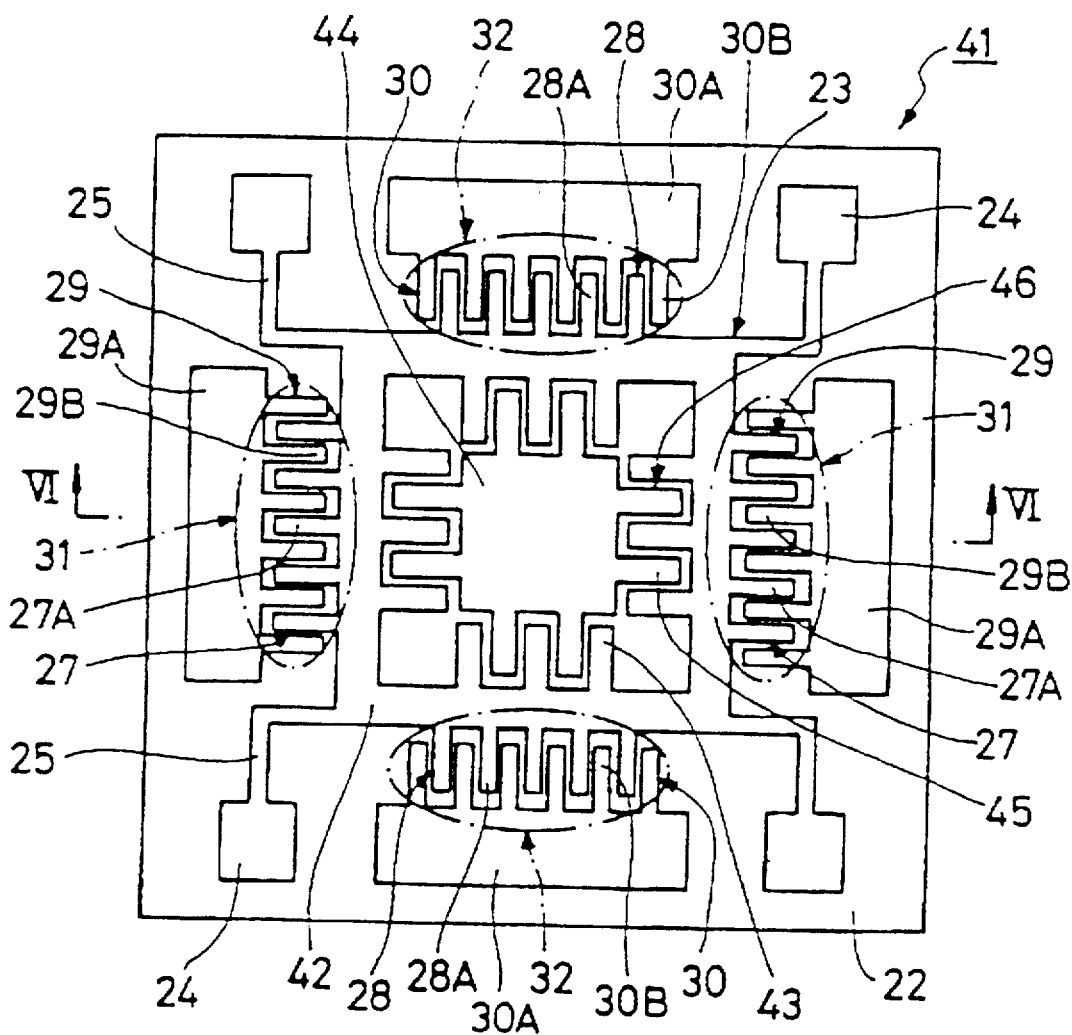
FIG. 5 is a plan view when the angular velocity sensor in FIG. 4 viewed from an upper side.
Figure 6:
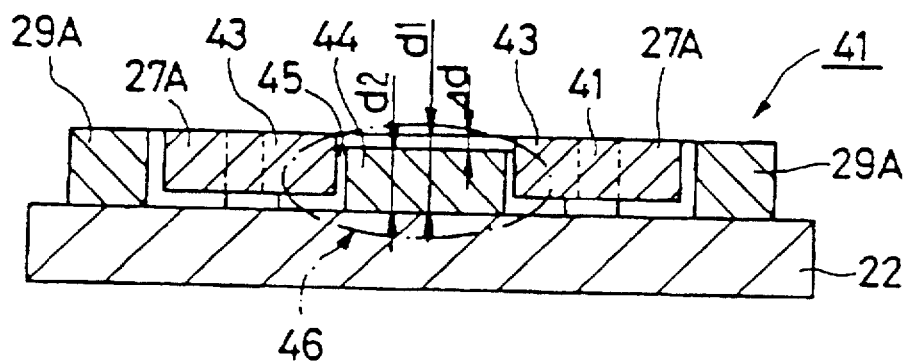
FIG. 6 is a longitudinal cross sectional view of the angular velocity sensor when viewed in the direction of the arrow VI—VI in FIG. 5.

Next, FIG. 4 to FIG. 6 show a second embodiment. This embodiment has a feature that the oscillation generation means is composed of an oscillator formed in a frame-shape and a columnar electrode disposed on a substrate so as to be spaced from the oscillator is meshed with the columnar electrode through a plurality of projections formed to the inside surfaces of the oscillator and the outside surface of the columnar electrode.

Note, the same numerals as used in the aforesaid first embodiment are used in the second embodiment to denote the same components and the description thereof is omitted.

In the drawings, numeral 41 denotes an angular velocity sensor according to this embodiment. Numeral 42 denotes a square frame-shaped oscillator serving as a part of a movable portion 23 formed on a substrate 22. The oscillator 42 is supported on the substrate 22 by four support portions 24 formed on the substrate 22 at the four corners thereof and support beams 25 each having a base end fixed to each of the support portions 24, so that the oscillator 42 is supported by the respective support beam 25 so as to move in three-axes directions, that is, in an X-axis direction and a Y-axis direction which are directed horizontally and a Z-axis direction which is directed vertically. A plurality of projections 43 are formed to the four inside surfaces of the oscillator 42 toward the center thereof. Further, movable-side comb-shaped electrodes 27, 27 constituting X-axis displacement sensing units 31 are projectingly formed to the right and left sides of the oscillator 42 and movable-side comb-shaped electrode 28, 28 constituting Y-axis displacement sensing units 32 are projectingly formed to the forward and backward sides of the oscillator 42.

Numeral 44 denotes a square columnar electrode disposed on the substrate 22 at the center thereof and a plurality of projections 45 are formed on the four outside surfaces of the columnar electrode 44 so as to alternately mesh with the respective projections 43 of the oscillator 42. Further, the intervals between the respective projections 45 of the columnar electrode 44 and the respective projections 43 of the oscillator 42 are defined equally like the relationship between the oscillator 26 and the columnar electrode 33 of the first embodiment. If the height of the oscillator 42 is d1 and the height of the columnar electrode 44 is d2 with respect to the substrate 22, the height d2 of the columnar electrode 44 is formed slightly shorter than the height d1 of the oscillator 42 by $\Delta d$ (see FIG. 6).

Numeral 46 denotes an oscillation generator serving as oscillation generation means which is composed of the frame-shaped oscillator 42 and the columnar electrode 44 located inwardly of the oscillator 42, the plurality of projections 43 formed on the inside surfaces of the oscillator 42 and the plurality of projections 45 formed on the outside surfaces of the columnar electrode 44 are disposed between the oscillator 42 and the columnar electrode 44 so as to be meshed with each other so that the effective area between the oscillator 42 and the columnar electrode 44 can be increased by the respective projections 43, 45.

Since the angular velocity sensor 41 according to this embodiment is arranged as described above, the displacement of the oscillator 42 in the X-axis direction caused by a Coriolis force when an angular velocity $\Omega Y$ is imposed about the Y-axis is sensed by the X-axis displacement sensing units 31, whereas the displacement of the oscillator 42 in the Y-axis direction caused by a Coriolis force when an angular velocity $\Omega X$ is imposed about the X-axis is sensed by the Y-axis displacement sensing units 32.

However since the plurality of projections 43 are disposed to the inside surfaces of the oscillator 42 constituting the oscillation generator 46 and the plurality of projections 45, which are meshed with the projections 43, respectively, are disposed to the outside surfaces of the columnar electrode 44, the effective area in the oscillation generator 46 can be increased as compared with that of the first embodiment; thus an electrostatic attracting force generated when an oscillation drive signal is imposed between the oscillator 42 and the columnar electrode 44 can be increased.

With this arrangement, since the electrostatic attracting force acts in the direction where the effective area between the oscillator 42 and the columnar electrode 44 is increased, the oscillator 42 is attracted to the position where it is as high as the columnar electrode 44 and the oscillator 42 is largely oscillated in the Z-axis direction by repeating the above operation at a resonant frequency. At this time, since the effective area in the oscillation generator 46 is increased by the respective projections 43, 45 in this embodiment, the amplitude of the oscillator 42 in the Z-axis direction can be increased by increasing the responsiveness of the oscillator 42 to the oscillation drive signal, whereby the sensing sensitivity of the angular velocities $\Omega Y$, $\Omega X$ in the X-axis displacement sensing units 31 and the Y-axis displacement sensing units 32 can be increased.

Figure 7:
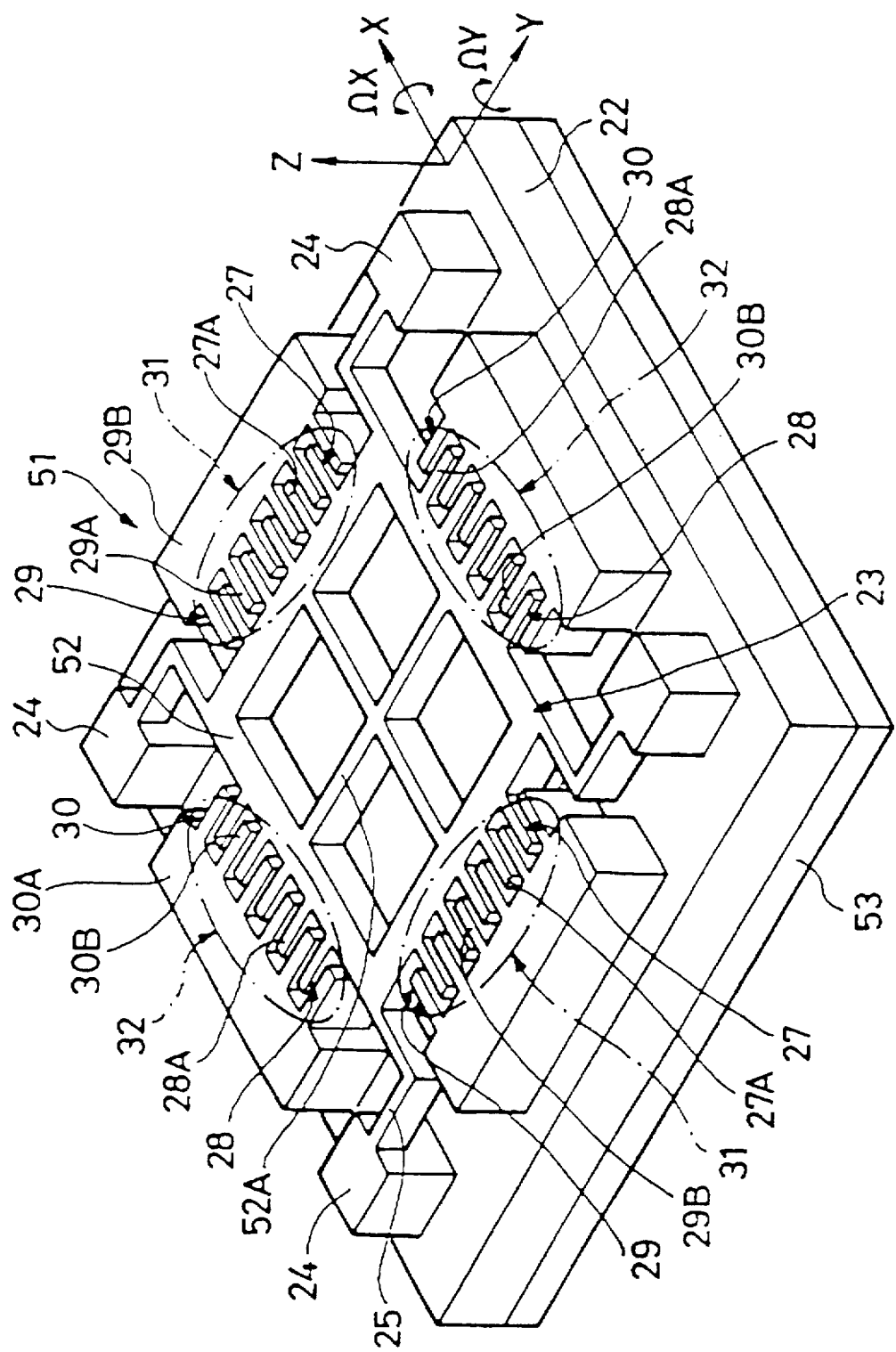
FIG. 7 is a perspective view showing an angular velocity sensor according to a third embodiment of the present invention.
Figure 8:
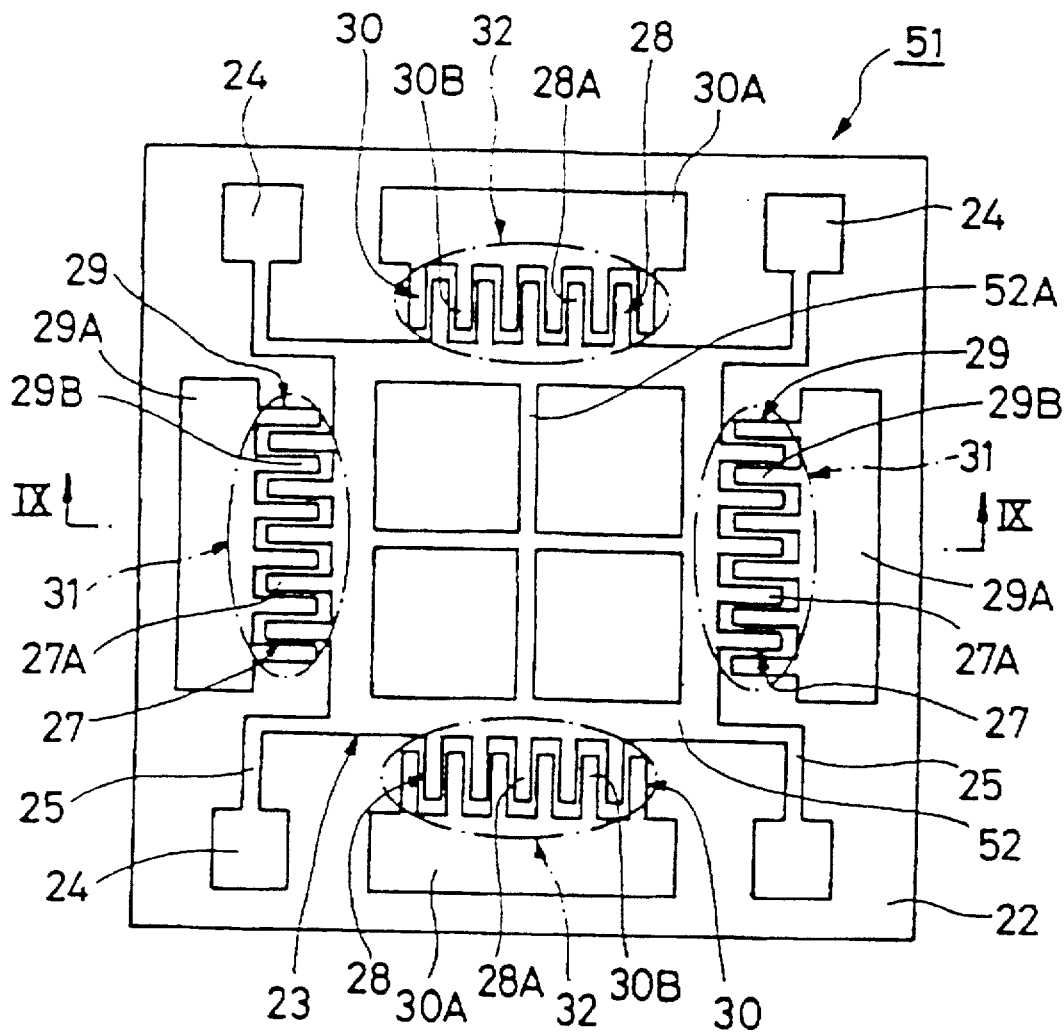
FIG. 8 is a plan view when the angular velocity sensor in FIG. 7 is viewed from an upper side.
Figure 9:
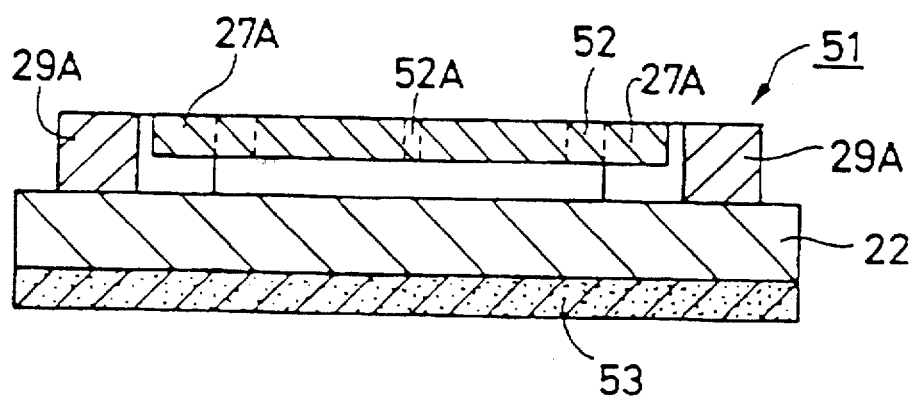
FIG. 9 is a longitudinal cross sectional view of the angular velocity sensor when viewed in the direction of the arrow IX—IX in FIG. 8.

Next, FIG. 7 to FIG. 9 show a third embodiment. This embodiment has a feature that a piezoelectric member serving as oscillation generation means is disposed on the lower surface of a substrate. Note, the same numerals as used in the aforesaid first embodiment are used in the third embodiment to denote the same components and the description thereof is omitted.

In the drawings, numeral 51 denotes an angular velocity sensor according to this embodiment. Numeral 52 denotes a square frame-shaped oscillator serving as a part of a movable portion 23 formed on a substrate 22. The oscillator 52 is supported on the substrate 22 by four support portions 24 formed on the substrate 22 at the four corners thereof and support beams 25 each having a base end fixed to each of the support portions 24, so that the oscillator 52 is supported by the respective support beams 25 so as to move in three-axes directions, that is, in an X-axis direction and a Y-axis direction which are directed horizontally and a Z-axis direction which is directed vertically. A cross-shaped framework 52A is formed inwardly of the oscillator 52 to prevent the distortion of the oscillator 52. Further, movable-side comb-shaped electrodes 27, 27 constituting X-axis displacement sensing units 31 are projectingly formed to the right and left sides of the oscillator 52 and movable-side comb-shaped electrodes 28, 28 constituting Y-axis displacement sensing units 32 are projectingly formed to the forward and backward sides thereof.

Numeral 53 denotes the piezoelectric member according to this embodiment serving as oscillation generation means which is bonded on the lower surface of the substrate 22 and composed of lead titanate, lead zirconate, lead titanate zirconate (PZT), zinc oxide (ZnO) . . . etc. formed to a plate-shape so that a polarization direction is oriented in a Z-axis direction.

In the angular velocity sensor 51 arranged as described above, polarization is caused to the piezoelectric member 53 in the Z-axis direction by imposing an oscillation drive signal to the piezoelectric member 53, so that the piezoelectric member 53 is oscillated in the Z-axis direction. With this operation, only the oscillator 52 capable of moving in the Z-axis direction of the movable portion 23 formed on the substrate 22 causes oscillation in the Z-axis direction. At this time, since the oscillator 52 is formed to the frame-shape to eliminate the air resistance between it and the substrate 22, it can generate a large amount of oscillation in the Z-axis direction.

When an angular velocity $\Omega Y$ is imposed about the Y-axis in the state that the oscillator 52 is oscillated in the Z-axis direction by the oscillation of the piezoelectric member 53, the oscillator 52 is displaced in the X-axis direction by a Coriolis force and the displacement is sensed by the X-axis displacement sensing units 31. On the other hand, when an angular velocity $\Omega X$ is imposed about the X-axis, the oscillator 42 is displaced in the Y-axis direction by a Coriolis force and the displacement can be sensed by the Y-axis displacement sensing units 32.

However, in the angular velocity sensor 51 according to this embodiment, since the oscillation generation means is composed of the piezoelectric member 53 disposed on the lower surface of the substrate 22, the oscillator 52 can be largely oscillated in the Z-axis direction, whereby the angular velocities $\Omega X$, $\Omega Y$ about the two axes or the X-axis and the Y-axis can be sensed with a pinpoint accuracy.

Since the interval between the oscillator 52 and the substrate 22 can be set to a large value in the angular velocity sensor 51 of this embodiment, the oscillation of the angular velocity sensor 51 in the Z-axis direction can be increased as compared with that of the above angular velocity sensors 21, 41. As a result, the angular velocity $\Omega Y$ about the Y-axis can be sensed by the X-axis displacement sensing units 31 and the angular velocity $\Omega X$ about the X-axis can be sensed by the Y-axis displacement sensing units 32 with a pinpoint accuracy, respectively.

Further, since the oscillator 52 is formed to the frame-shape and reinforced by the framework 52A, the air damping of the oscillator 52 can be reduced by greatly decreasing the air resistance between the oscillator 52 and the substrate 22. With this arrangement, the oscillator 52 can be largely oscillated in the Z-axis direction by the piezoelectric member 53, whereby the sensing sensitivity of the X-axis displacement sensing units 31 or the Y-axis displacement sensing units 32 can be enhanced by increasing the change of the oscillator 52 caused by the Coriolis force.

Figure 10:
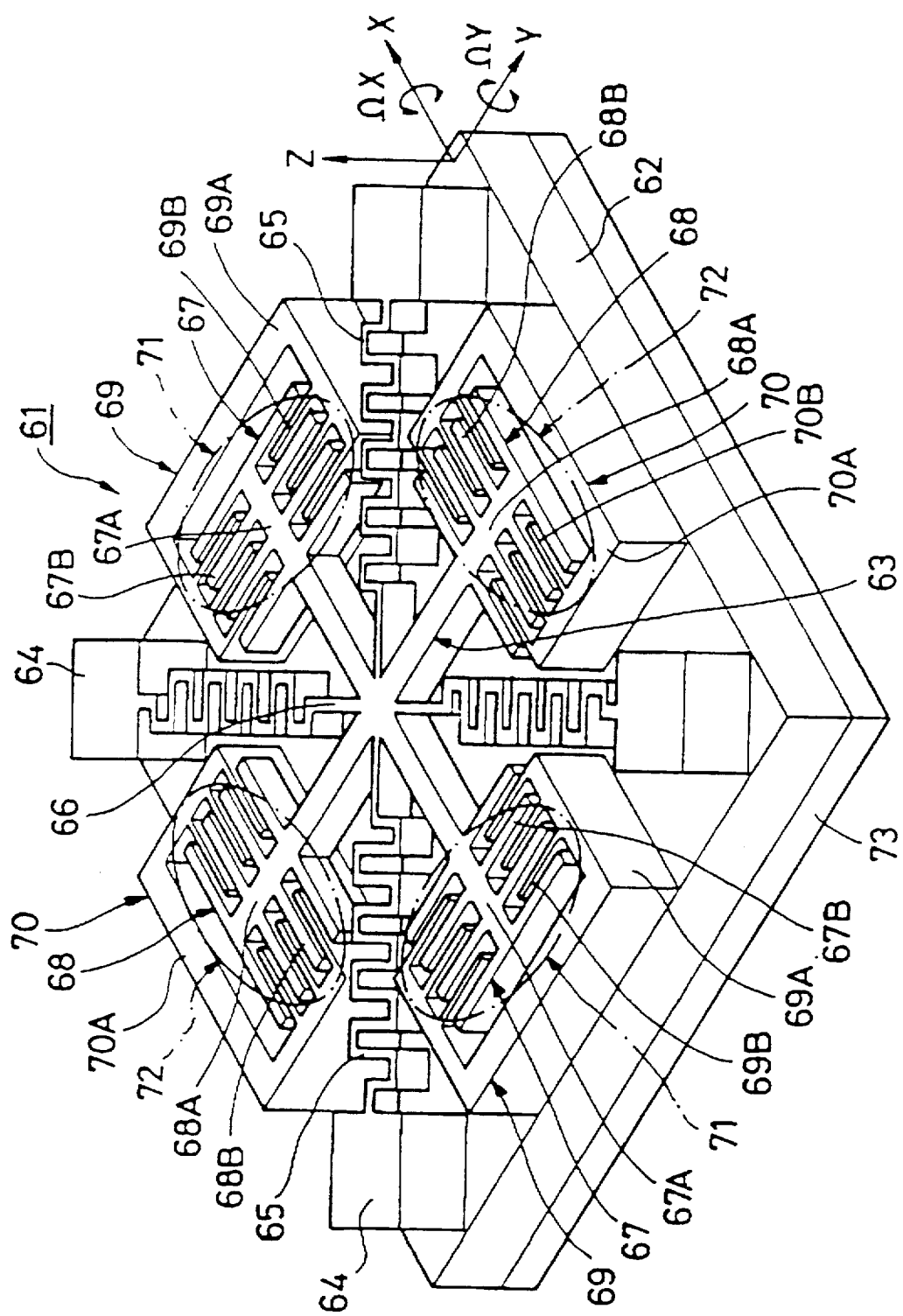
FIG. 10 is a perspective view showing an angular velocity sensor according to a fourth embodiment of the present invention.
Figure 11:
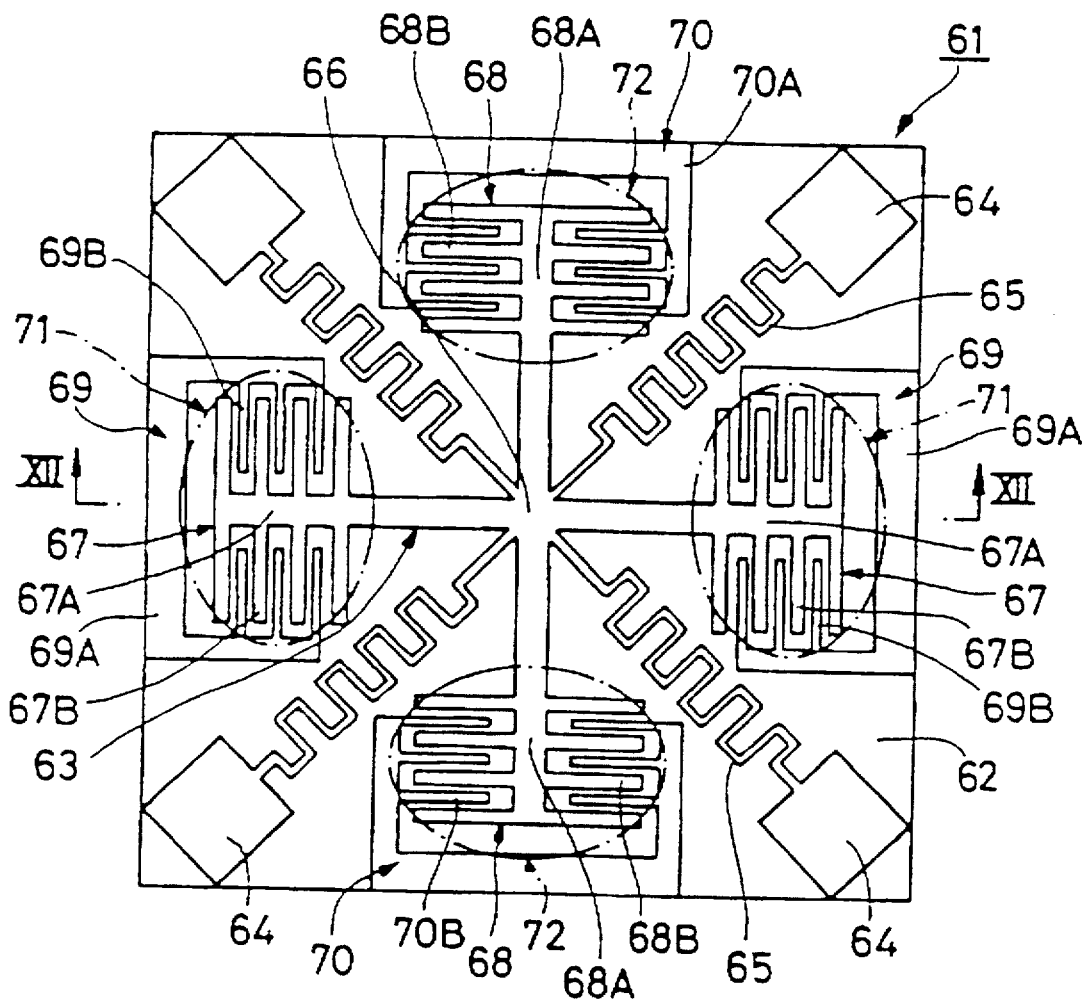
FIG. 11 is a plan view when the angular velocity sensor in FIG. 10 is viewed from an upper side.
Figure 12:
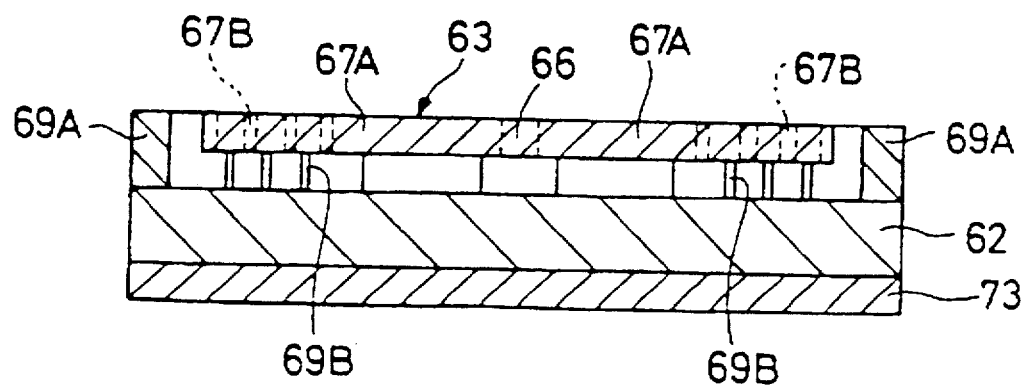
FIG. 12 is a longitudinal cross sectional view of the angular velocity sensor when viewed in the direction of the arrow XII—XII in FIG. 11.

Next, FIG. 10 to FIG. 12 show a fourth embodiment of the present invention. This embodiment has a feature that an oscillator is arranged as a material point located at the center of a substrate and X-axis displacement sensing units and Y-axis displacement sensing units are radially formed from the material point.

Note, the same numerals as used in the aforesaid first embodiment are used in the fourth embodiment to denote the same components and the description thereof is omitted.

In the drawings, numeral 61 denotes an angular velocity sensor according to this embodiment. Numeral 62 denotes a substrate 62 serving as the base table of the angular velocity sensor 61 and the substrate 62 is composed of a monocrystal silicon material of high resistance formed to a square sheet-shape.

Numeral 63 denotes a movable portion formed on the substrate 62. The movable portion 63 is composed of: four support portions 64 formed on the substrate 62 at the four corners thereof; four support beams 65 each having a base end fixed to each of the support portions 64 and an extreme end extending toward the center of the substrate 62 while bending in zigzag; and the material point 66 located at the extreme ends of the respective support beams 65 and serving as the oscillator. First movable-side comb-shaped electrodes 67, 67 to be described later are formed to both the right and left sides of the material point 66 and second movable-side comb-shaped electrodes 68, 68 are formed to both the forward and backward sides thereof, respectively in such a manner that the former electrodes 67 are perpendicular to the latter electrodes 68. Further, the movable portion 63 is fixed to the substrate 62 only through the respective support portions 64 and the respective support beams 65 and the material point 66 are held so as to displace in three-axes directions or an X-axis direction, a Y-axis direction and a Z-axis direction such that they are separated from the surface of the substrate 62.

Numerals 67, 67 denote the first movable-side comb-shaped electrodes and each of the electrodes 67 is composed of a branch portion 67A extending from the material point 66 in the X-axis direction and eight sheet-shaped electrode plates 67B located at the extreme end of the branch portion 67A and extending to both the sides in the Y-axis direction.

Numerals 68, 68 denote the second movable-side comb-shaped electrodes and each of the electrodes 68 is composed of a branch portion 68A extending from the material point 66 in the Y-axis direction and eight sheet-shaped electrode plates 68B located at the extreme end of the branch portion 68A and extending to both the sides in the X-axis direction. The respective first movable-side comb-shaped electrodes 67 are perpendicular to the respective second movable-side comb-shaped electrodes 68 and they are formed to a radial shape.

Numerals 69, 69 denote first fixed-side comb-shaped electrodes disposed on the substrate 62 on the right and left sides thereof. Each of the first fixed-side comb-shaped electrodes 69 is composed of a fixed portion 69A having an approximately C-shaped cross section opened toward the center of the substrate 62 and six sheet-shaped electrode plates 69B formed from both the arms of the fixed portion 69A so as to confront each other. The respective electrode plates 69B are disposed to be equally spaced apart from the respective electrode plates 67B of the above first movable-side comb-shaped electrode 67.

Numerals 70, 70 denote second fixed-side comb-shaped electrodes disposed on the substrate 62 on the forward and backward sides thereof. Each of the second fixed-side comb-shaped electrodes 70 is composed of a fixed portion 70A having an approximately C-shaped cross section opened toward the center of the substrate 62 and six sheet-shaped electrode plates 70B formed from both the arms of the fixed portion 70A so as to confront each other. The respective electrode plates 70B are disposed to be equally spaced apart from the respective electrode plates 68B of the above second movable-side comb-shaped electrode 68.

Numerals 71, 71 denote X-axis displacement sensing units serving as X-axis displacement sensing means, each of the sensing units 71 is composed of the first movable-side comb-shaped electrode 67 and the first fixed-side comb-shaped electrode 69, equal intervals are defined between the respective electrode plates 67B of the first movable-side comb-shaped electrode 67 and the respective electrode plates 69B of the first fixed-side comb-shaped electrode 69 and a parallel flat-plate sensing capacitor is composed of the first movable-side comb-shaped electrodes 67 and the first fixed-side comb-shaped electrodes 69. Further, the X-axis displacement sensing units 71 sense the change in intervals between the respective electrode plates 67B, 69B as the change in capacitance. In addition, the output sides of the right and left X-axis displacement sensing units 71 are connected to calculate the difference between the outputs therefrom.

Numerals 72, 72 denote Y-axis displacement sensing units serving as Y-axis displacement sensing means, each of the sensing units 72 is composed of the second movable-side comb-shaped electrode 68 and the second fixed-side comb-shaped electrode 70. Equal intervals are defined between the respective electrode plates 68B of the second movable-side comb-shaped electrode 68 and the respective electrode plates 70B of the second fixed-side comb-shaped electrode 70 and a parallel flat-sheet sensing capacitor is composed of the second movable-side comb-shaped electrodes 68 and the second fixed-side comb-shaped electrodes 70. Further, the Y-axis displacement sensing units 72 also sense the change in the intervals between the respective electrode plates 68B, 70B as a change in capacitance. In addition, the output sides of the forward and backward Y-axis displacement sensing units 72 are connected to calculate the difference between the outputs therefrom.

Numeral 73 denotes a piezoelectric member according to this embodiment serving as oscillation generation means which is bonded on the lower surface of the substrate 62 and composed of lead titanate, lead zirconate, lead titanate zirconate (PZT), zinc oxide (ZnO) . . . etc. formed to a plate-shape so that a polarization direction is oriented in a Z-axis direction.

Also in the angular velocity sensor 61 arranged as described above, polarization is caused to the piezoelectric member 73 in the Z-axis direction by imposing an oscillation drive signal to the piezoelectric member 73 as was done in operation of the angular speed sensor 51 of the aforesaid third embodiment, so that the piezoelectric member 73 is oscillated in the Z-axis direction. With this operation, only the material point 66 (including the movable-side comb-shaped electrodes 67, 68) capable of displacing in the Z-axis direction of the movable portion 63 formed on the substrate 62 can cause oscillation in the Z-axis direction. At this time, since the material point 66 and the movable-side comb-shaped electrodes 67, 68 are composed only of frameworks, the air resistance between them and the substrate 62 can be positively eliminated, thus a large amount of oscillation can be generated in the Z-axis direction.

In the angular velocity sensor 61 according to this embodiment, since the oscillation generating means is disposed on the lower surface of the substrate 62 instead of being disposed between the movable portion 63 and the substrate 62, the interval between the material point 66 and the substrate 62 can be secured, so that the material point 66 can be oscillated with a large amplitude. Therefore, when, for example, an angular velocity $\Omega Y$ is imposed about the Y-axis such that the material point 66 including the first movable-side comb-shaped electrodes 67, 68 is largely oscillated in the Z-axis direction by the piezoelectric member 73, the material point 66 is largely oscillated in the X-axis direction by a Coriolis force. The sensing sensitivity of the angular velocity sensor 61 can be enhanced by adding the oscillation of the material point 66 in the X-axis direction to the oscillation of the X-axis displacement sensing units 71, 71 disposed on the right and left sides.

Further, since the support beams 65 are formed to extend while bending in zigzag, the apparent length of the beams can be increased so as to make a spring constant small in any direction of the X-axis, Y-axis and Z-axis directions, so that the material point 66 can be easily moved in the three-axes directions and the sensing sensitivity of the angular velocity sensor 61 can be enhanced accordingly.

Figure 13:
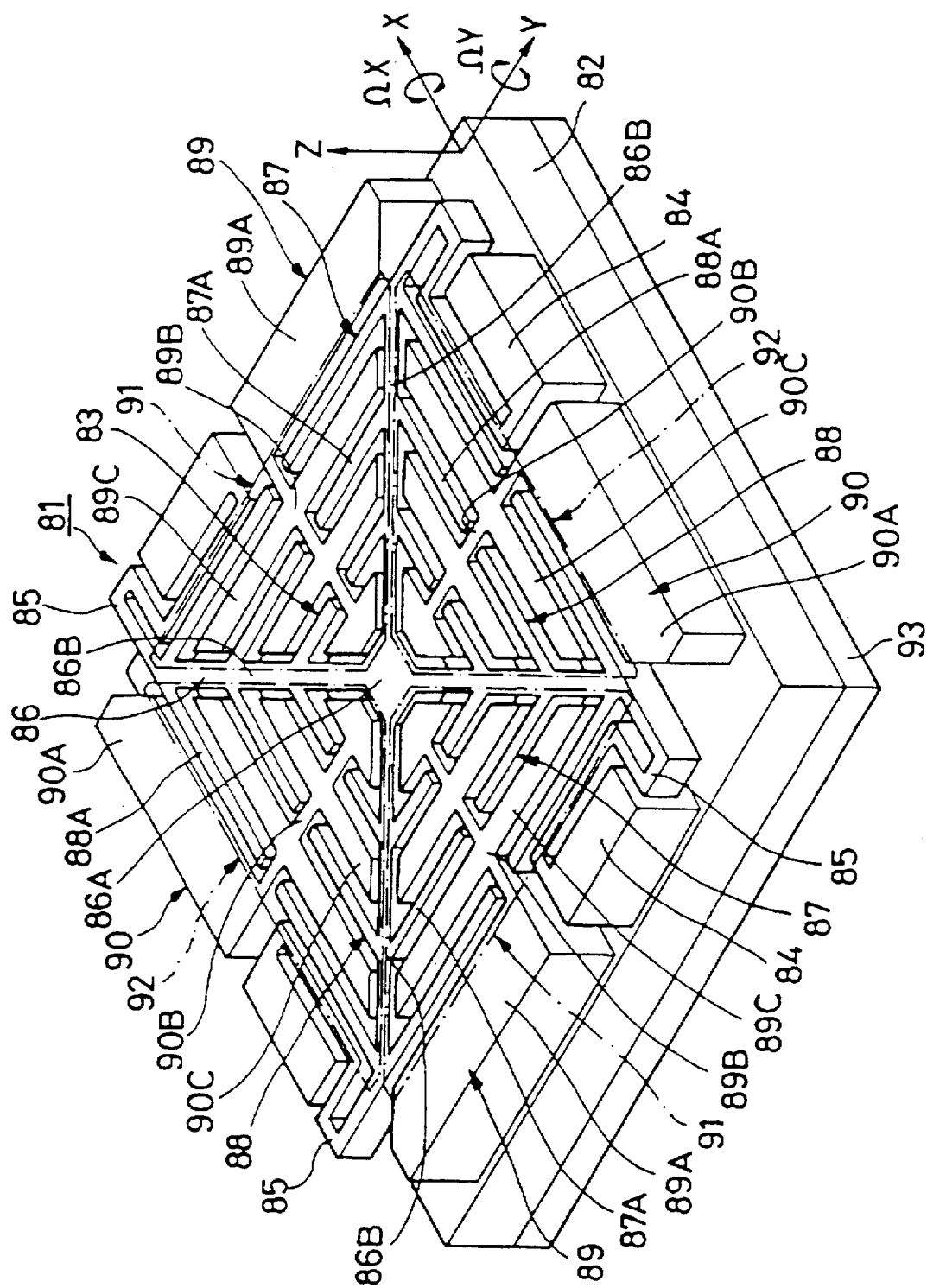
FIG. 13 is a perspective view showing an angular velocity sensor according to a fifth embodiment of the present invention.
Figure 14:
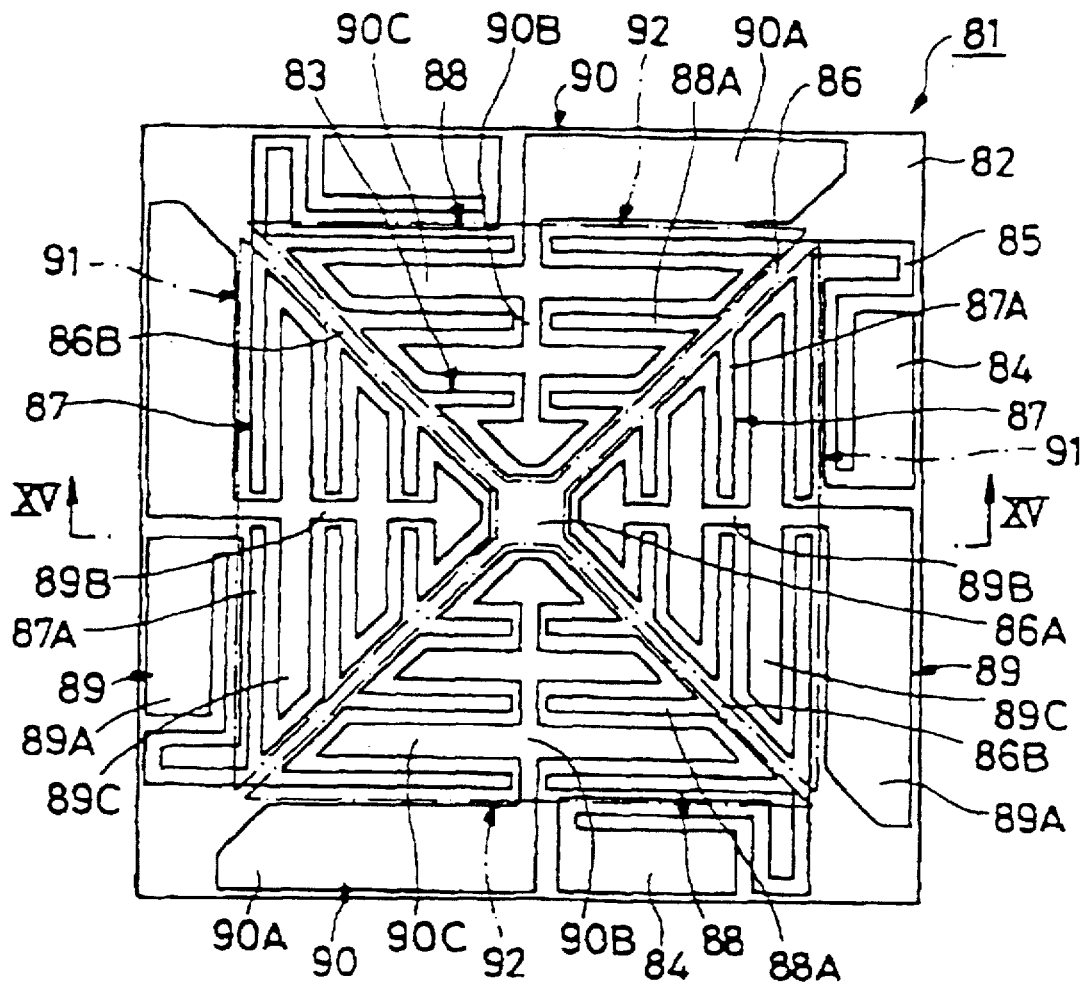
FIG. 14 is a plan view when the angular velocity sensor in FIG. 13 is viewed from an upper side.
Figure 15:
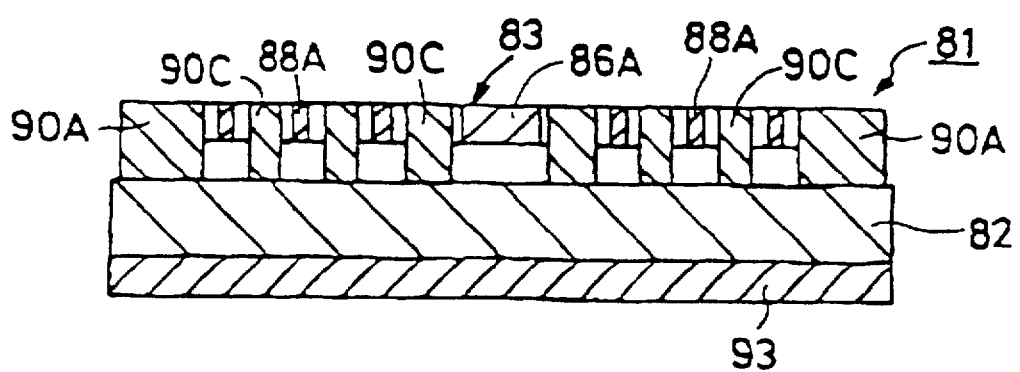
FIG. 15 is a longitudinal cross sectional view of the angular velocity sensor when viewed in the direction of the arrow XV—XV in FIG. 14.
Figure 16:
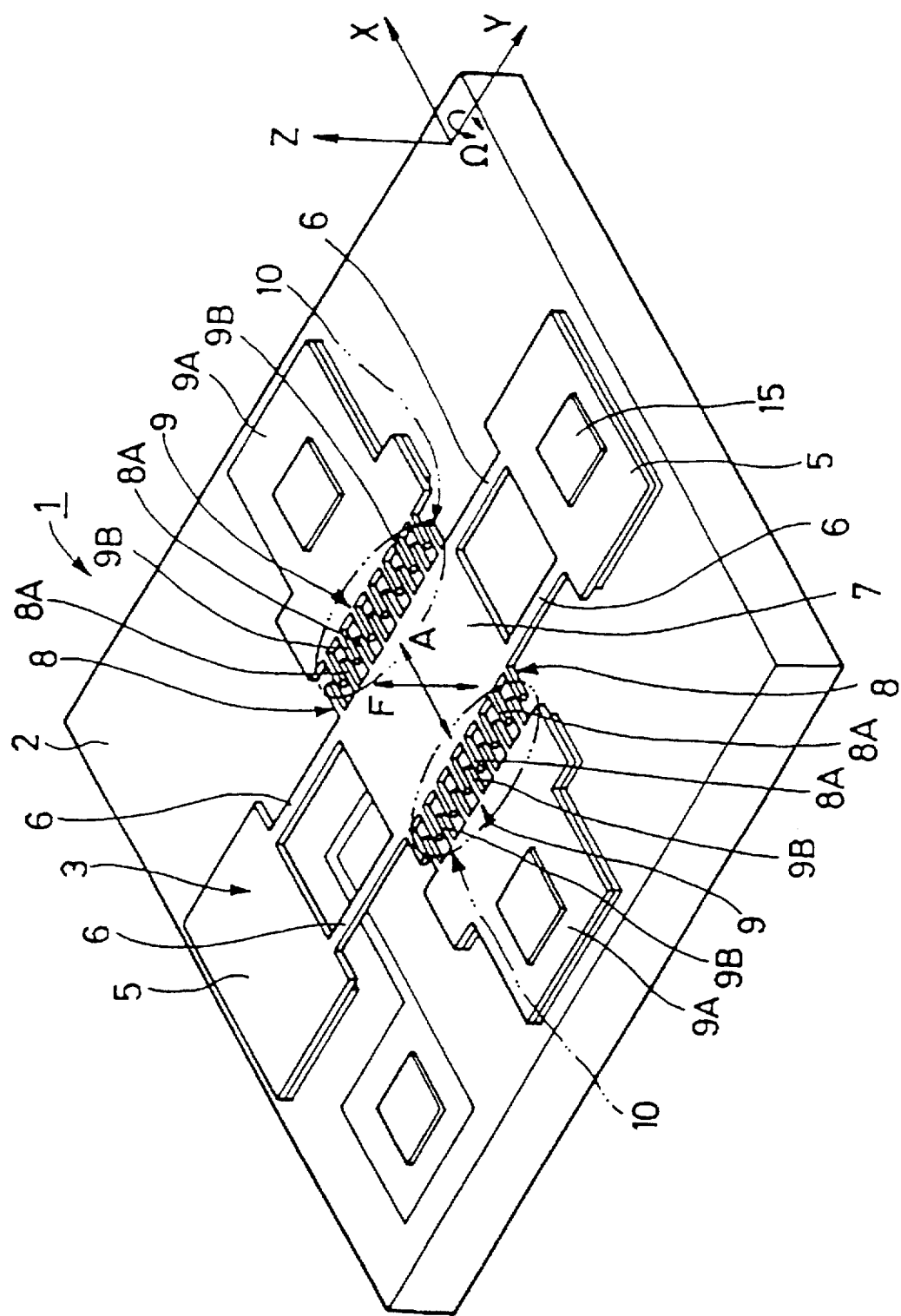
FIG. 16 is a perspective view showing an angular velocity sensor of prior art.
Figure 17:
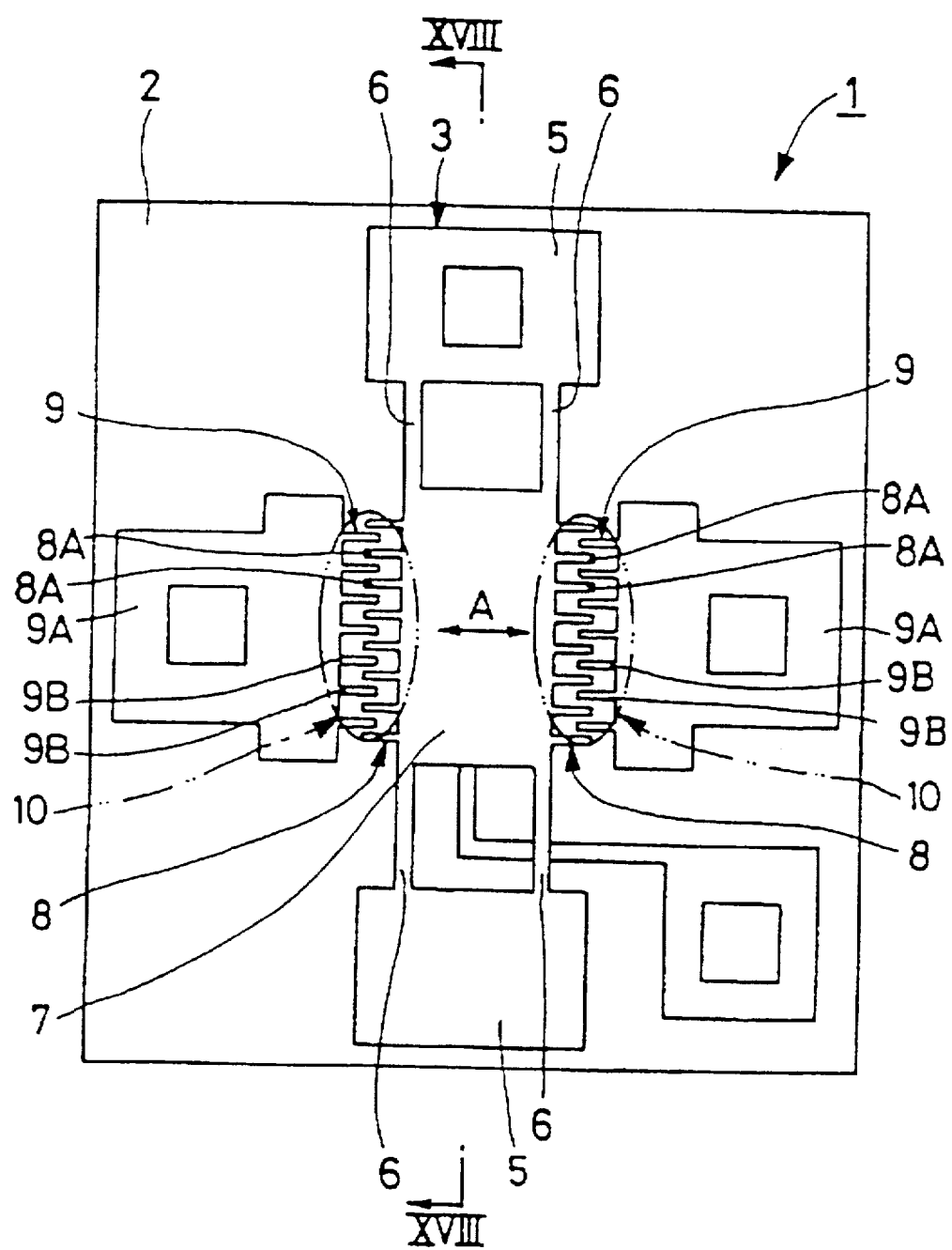
FIG. 17 is a plan view when the angular velocity sensor in FIG. 16 is viewed from an upper side.
Figure 18:
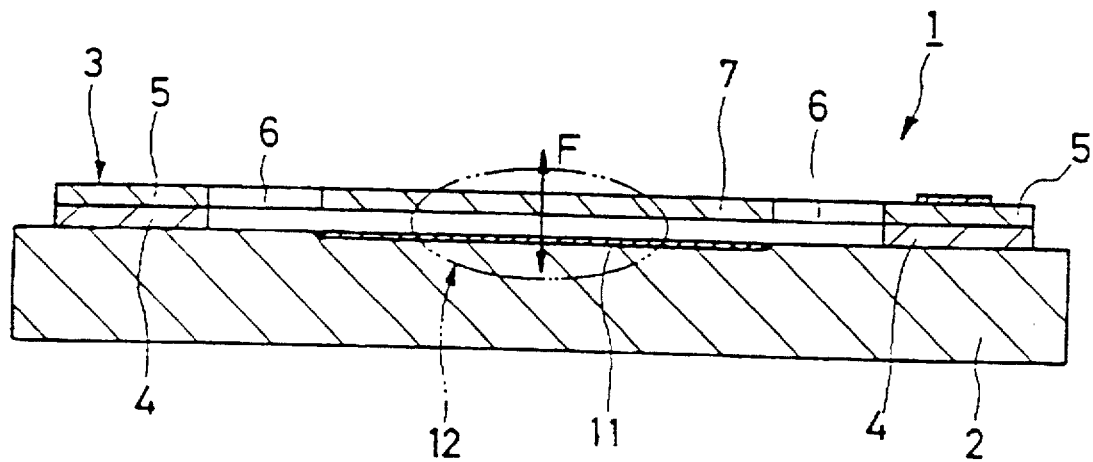
FIG. 18 is a longitudinal cross sectional view of the angular velocity sensor when viewed in the direction of the arrow XVIII—XVIII in FIG. 17.

Next, FIG. 13 to FIG. 15 show a fifth embodiment of the present invention. The fifth embodiment has a feature that an oscillator is arranged as a material point located at the center of a substrate and X-axis displacement sensing units and Y-axis displacement sensing units are radially formed from the material point as well as support beams are disposed to the outside to secure the sensing units in a large space.

Note, the same numerals as used in the aforesaid fourth embodiment are used in this embodiment to denote the same components and the description thereof is omitted.

In the drawings, numeral 81 denotes an angular velocity sensor according to this embodiment. Numeral 82 denotes a substrate 82 serving as the base table of the angular velocity sensor 81 and the substrate 82 is composed of a monocrystal silicon material of high resistance formed to a square sheet-shape.

Numeral 83 denotes a movable portion formed on the substrate 82. The movable portion 83 is composed of four support portions 84 formed on the substrate 82 at the four corners thereof, four support beams 85 each formed to an approximately C-shape and having a base end fixed to each of the support portions 84 and an oscillator 86 disposed at the extreme ends of the respective support beams 85.

The oscillator 86 is composed of a disk portion 86A located at the center of the substrate 82 and four arm portions 86B extending from the disk portion 86A toward the four support portions 84 on diagonal lines in a cross-shape as well as four triangular regions are partitioned by the four arm portions 86B. The movable portion 83 is fixed to the substrate 82 only through the respective support portions 84 and the respective support beams 85 and the oscillator 86 are held so as to displace in three-axes directions or X-axis, Y-axis and Z-axis directions such that they are separated from the surface of the substrate 82.

Numeral 87, 87 denote first movable-side comb-shaped electrodes formed integrally with the oscillator 86. The respective electrodes 87 are each composed of six electrode plates 87A which are located in the right and left triangular regions along the X-axis of the substrate 82 and extend inwardly of the respective triangular regions at each predetermined interval in the lengthwise direction of the adjacent arm portions 86B of the above oscillator 86. Each of the electrode plates 87A is parallel with the substrate 82 and inclined 45 degree with respect to the arm portion 86B.

Numeral 88, 88 denote second movable-side comb-shaped electrodes formed integrally with the oscillator 86. The respective electrodes 88 are each composed of six electrode plates 88A which are located in the forward and backward triangular regions along the Y-axis of the substrate 82 and extend inwardly of the respective triangular regions at each predetermined interval in the lengthwise direction of the adjacent arm portions 86B of the above oscillator 86. Each of the electrode plates 88A is parallel with the substrate 82 and inclined 45 degree with respect to the arm portion 86B. Further, the first movable-side comb-shaped electrodes 87, 87 and the second movable-side comb-shaped electrodes 88, 88 are alternately disposed.

Numerals 89, 89 denote first fixed-side comb-shaped electrodes disposed on the substrate 82 on the right and left sides thereof. The respective electrodes 89 are formed in the right and left triangular regions along the X-axis of the four triangular regions partitioned by the arm portions 86B. Each of the electrodes 89 is composed of a fixed portion 89A located to the outer peripheral side of the substrate 82, a branch portion 89B extending from the base end of the fixed portion 89A toward the center of the substrate 82 and five electrode plates 89C extending at each predetermined interval in the lengthwise direction of the branch portion 89B. Each of the electrode plates 89C is disposed perpendicular to the branch portion 89B. Further, the respective electrode plates 87A of the first movable-side comb-shaped electrodes 87, 87 are disposed so as to be spaced apart from and alternately meshed with the respective electrode plates 89C of the first fixed-side comb-shaped electrodes 89, 89.

Numerals 90, 90 denote second fixed-side comb-shaped electrodes disposed on the substrate 82 on the forward and backward sides thereof. The respective electrodes 90 are formed in the forward and backward triangular regions along the Y-axis of the four triangular regions partitioned by the four arm portions 86B. Each of electrodes 90 is composed of a fixed portion 90A located to the outer peripheral side of the substrate 82, a branch portion 90B extending from the base end of the fixed portion 90A toward the center of the substrate 82 and five electrode plates 90C extending at each predetermined interval in the lengthwise direction of the branch portion 90B. Each of the electrode plates 90C is disposed perpendicular to the branch portion 90B. The first movable-side comb-shaped electrodes 89, 89 and the second fixed-side comb-shaped electrodes 90, 90 are alternately disposed on the substrate 82. Further, the respective electrode plates 88A of the second movable-side comb-shaped electrodes 88, 88 are disposed so as to be spaced apart from and alternately meshed with the respective electrode plates 90C of the second fixed-side comb-shaped electrodes 90, 90.

Numerals 91, 91 denote X-axis displacement sensing units serving as X-axis displacement sensing means, each of the sensing units 91 is composed of the first movable-side comb-shaped electrode 87 and the first fixed-side comb-shaped electrode 89, equal intervals are defined between the respective electrode plates 87A of the first movable-side comb-shaped electrode 87 and the respective electrode plates 89C of the first fixed-side comb-shaped electrode 89 and a parallel flat-plate sensing capacitor is composed of the first movable-side comb-shaped electrodes 87 and the first fixed-side comb-shaped electrodes 89. Further, the X-axis displacement sensing units 91 sense the change in intervals between the respective electrode plates 87A, 89C as the change in capacitance. In addition, the output sides of the right and left X-axis displacement sensing units 91 are connected to calculate the difference between the outputs therefrom.

Numerals 92, 92 denote Y-axis displacement sensing units serving as Y-axis displacement sensing means, each of the sensing units 92 is composed of the second movable-side comb-shaped electrode 88 and the second fixed-side comb-shaped electrode 90. Equal intervals are defined between the respective electrode plates 88A of the second movable-side comb-shaped electrode 88 and the respective electrode plates 90C of the second fixed-side comb-shaped electrode 90 and a parallel flat-sheet sensing capacitor is composed of the second movable-side comb-shaped electrodes 88 and the second fixed-side comb-shaped electrodes 90. Further, the Y-axis displacement sensing units 92 also sense the change in intervals between the respective electrode plates 88A, 90C as the change in capacitance. In addition, the output sides of the forward and backward Y-axis displacement sensing units 92 are connected to calculate the difference between the outputs therefrom.

Numeral 93 denotes a piezoelectric member according to this embodiment serving as oscillation generation means which is bonded to the lower surface of the substrate 82 and composed of lead titanate, lead zirconate, lead titanate zirconate (PZT), zinc oxide (ZnO) . . . etc. formed to a plate-shape so that a polarization direction is oriented in a Z-axis direction.

Also, in the angular velocity sensor 81 arranged as described above, a large amount of oscillation can be caused to the oscillator 86 including the movable-side comb-shaped electrodes 87, 88 by the piezoelectric member 93, as was the case for the fourth embodiment, whereby angular velocities imposed about the X-axis and the Y-axis can be sensed with a pinpoint accuracy.

Further, the shape of the respective electrode plates 87A, 88B, 89C and 90C of the comb-shaped electrodes 87, 88 and 90 of the angular velocity sensor 81 can be increased, so that the displacement of the movable-side comb-shaped electrodes 87, 88 in the X-axis displacement sensing units 91 and the Y-axis displacement detecting units 92 is increased to thereby greatly enhance the sensing sensitivity of the angular speed sensor 81 as compared with that of the angular speed sensor 61 of the fourth embodiment.

Note, although the above respective embodiments describe that the displacement in the X-axis direction and the displacement in the Y-axis direction are alternately sensed in time, it is needless to say that the present invention is not limited to it but the displacements in the X-axis and Y-axis directions may be simultaneously sensed depending upon the direction in which an angular velocity acts.

As described above in detail, in the one aspect of the present invention, when, for example, an angular velocity is imposed about the Y-axis such that the oscillator is oscillated in the Z-axis direction by the oscillation generation means, the oscillator is displaced in the X-axis direction by receiving a Coriolis force and the displacement sensing means can sense the displacement of the oscillator as an angular velocity about the Y-axis direction added to the angular velocity. On the other hand, when an angular velocity is imposed about the Y-axis, the oscillator is displaced in the Y-axis direction by receiving a Coriolis force and the displacement sensing means can sense the displacement of the oscillator in the Y-axis direction as an angular velocity imposed about the X-axis of the angular velocity sensor. As a result, the angular velocity sensor capable of sensing the angular velocities about the two axes or the X-axis and the Y-axis can be arranged in a small space, whereby substrate area and manufacturing cost can be reduced as well as the performance of the sensor can be remarkably enhanced.

In the another aspect of the present invention, when an oscillation drive signal of a predetermined frequency is imposed between the frame-shaped oscillator and the columnar electrode, an electrostatic attracting force is generated between the oscillator and the columnar electrode and acts in the direction where the effective area between the oscillator and the columnar electrode is increased and as a result the oscillator is attracted to the substrate side and the repetition of the above operation causes the oscillator to oscillate in the Z-axis direction. Then an angular velocity imposed about the Y-axis or the Z-axis can be sensed such that the oscillator is oscillated in the Z-axis direction.

In the still another aspect of the present invention, since the oscillation generation means is composed of the piezoelectric member fixed on the lower surface of the substrate, when an oscillation drive signal is imposed on the piezoelectric member, it repeats extension and contraction in the Z-axis direction to thereby generate oscillation to the substrate, so that the oscillator formed on the substrate can be oscillated in the Z-axis direction. As a result, an interval can be secured between the oscillator and the substrate, an amplitude caused by the oscillation of the oscillator in the Z-axis direction can be increased and sensing sensitivity can be enhanced.

In the further aspect of the present invention, when, for example, an angular velocity is imposed about the Y-axis such that the oscillator is oscillated in the Z-axis direction by the oscillation generation means, the oscillator is displaced in the X-axis direction by receiving a Coriolis force, the displacement appears as the change in effective area or interval between the first movable-side electrode and the fixed-side electrode and the X-axis direction displacement sensing means senses the change as the change in capacitance. On the other hand, when an angular velocity is imposed about the X-axis, the oscillator is displaced in the Y-axis direction by receiving a Coriolis force, the displacement appears as the change in effective area or interval between the second movable-side electrode and the second fixed-side electrode and the Y-axis direction displacement sensing means can sense the change as the change in capacitance with a pinpoint accuracy.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An angular velocity sensor, comprising a substrate, an oscillator structured and arranged with respect to a surface of said substrate so as to displace in three-axes directions composed of an X-axis direction, a Y-axis direction and a Z-axis direction with respect to said substrate, means for oscillating said oscillator in the Z-axis direction and displacement sensing means for sensing the amount of displacement of said oscillator when said oscillator is displaced in the Y-axis direction or the X-axis direction by an angular velocity about the X-axis or the Y-axis.

2. An angular velocity sensor according to claim 1, wherein said oscillator is formed in a frame-shape.

3. An angular velocity sensor according to claim 1, wherein said displacement sensing means constitutes an X-axis direction displacement sensing means comprising a first movable-side electrode formed in the X-axis direction of said oscillator and a first fixed-side electrode formed on said substrate so as to confront said first movable-side electrode and a Y-axis direction displacement sensing means comprising a second movable-side electrode formed in the Y-axis direction of said oscillator and a second fixed-side electrode formed on said substrate so as to confront said second movable-side electrode.

4. An angular velocity sensor according to claim 3, wherein said first movable-side electrode has a plurality of extending plates and said first fixed-side electrode has a plurality of extending plates, said first movable-side electrode and said first fixed-side electrode being arranged with respect to each other such that said plates of said first movable-side electrode and said first fixed-side electrode mesh with one other.

5. An angular velocity sensor according to claim 4, wherein said second movable-side electrode has a plurality of extending plates and said second fixed-side electrode has a plurality of extending plates, said second movable-side electrode and said second fixed-side electrode being arranged with respect to each other such that said plates of said second movable-side electrode and said second fixed-side electrode mesh with one other.

6. An angular velocity sensor according to claim 1, wherein a plurality of support portions are disposed on the substrate and a plurality of support beams each having a base end connected to a respective one of said support portions and an extending end, and wherein said oscillator is connected to said extending ends of said support beams.

7. An angular velocity sensor according to claim 6, wherein said displacement sensing means constitutes an X-axis direction displacement sensing means comprising a first movable-side electrode formed in the X-axis direction of said oscillator and a first fixed-side electrode formed on said substrate so as to confront said first movable-side electrode and a Y-axis direction displacement sensing means comprising a second movable-side electrode formed in the Y-axis direction of said oscillator and a second fixed-side electrode formed on said substrate so as to confront said second movable-side electrode.

8. An angular velocity sensor according to claim 7, wherein said first movable-side electrode has a plurality of extending plates and said first fixed-side electrode has a plurality of extending plates, said first movable-side electrode and said first fixed side electrode being arranged with respect to each other such that said plates of said first movable-side electrode and said first fixed-side electrode mesh with one other.

9. An angular velocity sensor according to claim 8, wherein said second movable-side electrode has a plurality of extending plates and said second fixed-side electrode has a plurality of extending plates, said second movable-side electrode and said second fixed side electrode being arranged with respect to each other such that said plates of said second movable-side electrode and said second fixed-side electrode mesh with one other.

10. An angular velocity sensor according to claim 1, wherein said oscillator comprises an outer frame and a cross-shaped framework formed inwardly of and connected to said outer frame.

11. An angular velocity sensor according to claim 10, wherein said oscillation generation means includes a piezoelectric member fixed on the lower surface of said substrate.

12. An angular velocity sensor according to claim 11, wherein said displacement sensing means includes first movable-side electrodes and second movable-side electrodes connected to respective beams and wherein first and second fixed-side electrodes are arranged on said substrate to mesh with said first and second movable-side electrodes, respectively.

13. An angular velocity sensor according to claim 12, wherein each of said first movable-side electrodes has a plurality of extending plates and each of said first fixed-side electrodes has a plurality of extending plates, said first movable-side electrodes and said first fixed side electrodes being arranged with respect to each other such that said plates of respective ones of said first movable-side electrodes and said first fixed-side electrodes mesh with one other.

14. An angular velocity sensor according to claim 13, wherein each of said second movable-side electrodes has a plurality of extending plates and each of said second fixed-side electrodes has a plurality of extending plates, said second movable-side electrodes and said second fixed side electrodes being arranged with respect to each other such that said plates of respective ones of said second movable-side electrodes and said second fixed-side electrodes mesh with one other.

15. An angular velocity sensor according to claim 14, wherein a plurality of support portions are disposed on the substrate and a plurality of support beams each having a base end connected to a respective one of said support portions and an extending end and said oscillator is connected to said extending ends of said support beams.

16. An angular velocity sensor according to claim 1, wherein said oscillator includes a central portion spaced from the substrate and movable in said X, Y and Z directions with respect to the substrate, said central portion being connected to a plurality of radially arranged support beams, each support beam connected to the central portion at respective first ends and being connected to respective support portions at respective opposite ends.

17. An angular velocity sensor according to claim 16, wherein each beam extends from its first to its opposite end in zig-zag exact fashion.

18. An angular velocity sensor according to claim 16, wherein said displacement sensing means includes first movable side electrodes and second movable side-electrodes connected to the central portion by respective beams.

19. An angular velocity sensor according to claim 18, wherein said first and second movable-side electrodes each includes a plurality of plates extending from said beams at an angle of 45° thereto.

20. An angular velocity sensor according to claim 16, wherein said oscillator includes a piezoelectric member fixed on the lower surface of said substrate.

21. An angular velocity sensor, comprising a substrate, an oscillator structured and arranged with respect to a surface of said substrate so as to displace in three-axes directions composed of an X-axis direction, a Y-axis direction and a Z-axis direction with respect to said substrate, means for oscillating said oscillator in the Z-axis direction and displacement sensing means for sensing the amount of displacement of said oscillator when said oscillator is displaced in the Y-axis direction or the X-axis direction by an angular velocity about the X-axis or the Y-axis; said oscillator being formed in a frame-shape and a columnar electrode being located in said oscillator so as to be fixed to said substrate, said columnar electrode having a height lower than the height of said oscillator.

22. An angular velocity sensor according to claim 21, wherein a plurality of support portions are disposed on the substrate and a plurality of support beams each having a base end connected to a respective one of said support portions and an extending end and said oscillator is connected to said extending ends of said support beams.

23. An angular velocity sensor, comprising a substrate, an oscillator structured and arranged with respect to a surface of said substrate so as to displace in three-axes directions composed of an X-axis direction, a Y-axis direction and a Z-axis direction with respect to said substrate, a generator for oscillating said oscillator in the Z-axis direction and a displacement sensor for sensing the amount of displacement of said oscillator when said oscillator is displaced in the Y-axis direction or the X-axis direction by an angular velocity about the X-axis or the Y-axis.

* * * * *